United States Patent
Yamada

(10) Patent No.: US 11,956,401 B2
(45) Date of Patent: Apr. 9, 2024

(54) MANAGEMENT SERVER, NON-TRANSITORY COMPUTER-READABLE STORAGE MEDIUM STORING MANAGEMENT PROGRAM, AND IMAGE PROCESSING SYSTEM THAT CONDUCTS CHARGING AMOUNT TO BE PAID TO AN ADMINISTRATOR FOR PRINTING NUMBER OF SHEETS

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/456,394

(22) Filed: Nov. 24, 2021

(65) Prior Publication Data

US 2022/0174179 A1    Jun. 2, 2022

(30) Foreign Application Priority Data

Nov. 27, 2020   (JP) ................................. 2020-197215

(51) Int. Cl.
| | | |
|---|---|---|
| *H04N 1/34* | (2006.01) | |
| *G06F 3/12* | (2006.01) | |
| *G06F 3/06* | (2006.01) | |
| *H04N 1/00* | (2006.01) | |

(52) U.S. Cl.
CPC ........... *H04N 1/346* (2013.01); *G06F 3/1204* (2013.01); *G06F 3/1238* (2013.01); *G06F 3/0604* (2013.01); *H04N 1/00509* (2013.01)

(58) Field of Classification Search
None
See application file for complete search history.

(56) References Cited

U.S. PATENT DOCUMENTS

| | | | |
|---|---|---|---|
| 11,295,279 B2 * | 4/2022 | Fisher ................... | B65D 27/04 |
| 2002/0024686 A1 * | 2/2002 | Uchiyama .......... | H04N 1/00413 |
| | | | 358/407 |
| 2005/0225796 A1 * | 10/2005 | Horihata ............ | H04N 1/00222 |
| | | | 358/1.15 |
| 2010/0238458 A1 * | 9/2010 | Sakuda .............. | H04N 1/33307 |
| | | | 358/1.15 |
| 2010/0317420 A1 * | 12/2010 | Hoffberg ............ | G06Q 30/0282 |
| | | | 463/1 |
| 2018/0146102 A1 * | 5/2018 | Oguma ................. | G06F 3/1236 |
| 2019/0236662 A1 | 8/2019 | Sun et al. | |

FOREIGN PATENT DOCUMENTS

| | | |
|---|---|---|
| JP | 2018-025883 A | 2/2018 |
| JP | 2019-133381 A | 8/2019 |

\* cited by examiner

*Primary Examiner* — Haris Sabah
(74) *Attorney, Agent, or Firm* — WORKMAN NYDEGGER

(57) ABSTRACT

A management server includes a server communication unit connected to an office PC through a global network, an acquisition unit that acquires action information on a printer through the office PC connected to the server communication unit, a server storage unit that links a printer ID with an administrator ID and stores the printer ID and the administrator ID, and a calculation unit that calculates an amount of money paid to an administrator indicated by the administrator ID linked with the printer ID of the printer concerning the acquired action information based on the action information acquired by the acquisition unit.

20 Claims, 13 Drawing Sheets

MANAGEMENT SERVER, NON-TRANSITORY COMPUTER-READABLE STORAGE MEDIUM STORING MANAGEMENT PROGRAM, AND IMAGE PROCESSING SYSTEM THAT CONDUCTS CHARGING AMOUNT TO BE PAID TO AN ADMINISTRATOR FOR PRINTING NUMBER OF SHEETS

The present application is based on, and claims priority from JP Application Serial Number 2020-197215, filed Nov. 27, 2020, the disclosure of which is hereby incorporated by reference herein in its entirety.

BACKGROUND

1. Technical Field

The present disclosure relates to a management server, a non-transitory computer-readable storage medium storing a management program, and an image processing system.

2. Related Art

A technique for charging for use of an image processing device has heretofore been known. For example, JP-A-2019-133381 discloses a system that conducts charging based on a user who is successfully authenticated and/or based on a group that the user belongs to.

The system according to JP-A-2019-133381 does not take into account a revenue of an administrator of the image processing device. As a consequence, the administrator cannot gain the revenue from administration of the image processing device.

SUMMARY

A management server according to an aspect for solving the above-mentioned problem is a management server administered by an administrator and connected to a control device that communicates with an image processing device used by a user, which includes a connection unit connected to the control device through a network, an acquisition unit that acquires action information on the image processing device conducted by the user from the control device connected to the connection unit, a storage unit that links identification information on the image processing device with administrator information indicating the administrator of the image processing device and stores the identification information and the administrator information, and a calculation unit that calculates an amount of money paid to the administrator indicated by the administrator information linked with the identification information on the image processing device concerning the acquired action information based on the action information acquired by the acquisition unit.

Another aspect for solving the above-mentioned problem provides a non-transitory computer-readable storage medium storing a management program to be executed by a computer of a management server administered by an administrator and connected to a control device that communicates with an image processing device used by a user. The management program causes the computer to acquire action information on the image processing device from the control device connected through a network, to link identification information on the image processing device with administrator information indicating the administrator of the image processing device and to store the identification information and the administrator information, and to calculate an amount of money paid to the administrator indicated by the administrator information linked with the identification information on the image processing device concerning the acquired action information based on the acquired action information.

Still another aspect for solving the above-mentioned problem provides an image processing system to be administered by an administrator, which includes an image processing device used by a user, a control device that communicates with the image processing device, and a management server connected to the control device through a network. Here, the management server includes a server connection unit that is connected to the control device through the network, an acquisition unit that acquires action information on the image processing device from the control device connected to the server connection unit, a storage unit that links identification information on the image processing device with administrator information indicating the administrator of the image processing device and stores the identification information and the administrator information, and a calculation unit that calculates an amount of money paid to the administrator indicated by the administrator information linked with the identification information on the image processing device concerning the acquired action information based on the action information acquired by the acquisition unit.

DESCRIPTION OF EXEMPLARY EMBODIMENTS

First Embodiment

Figure 1:
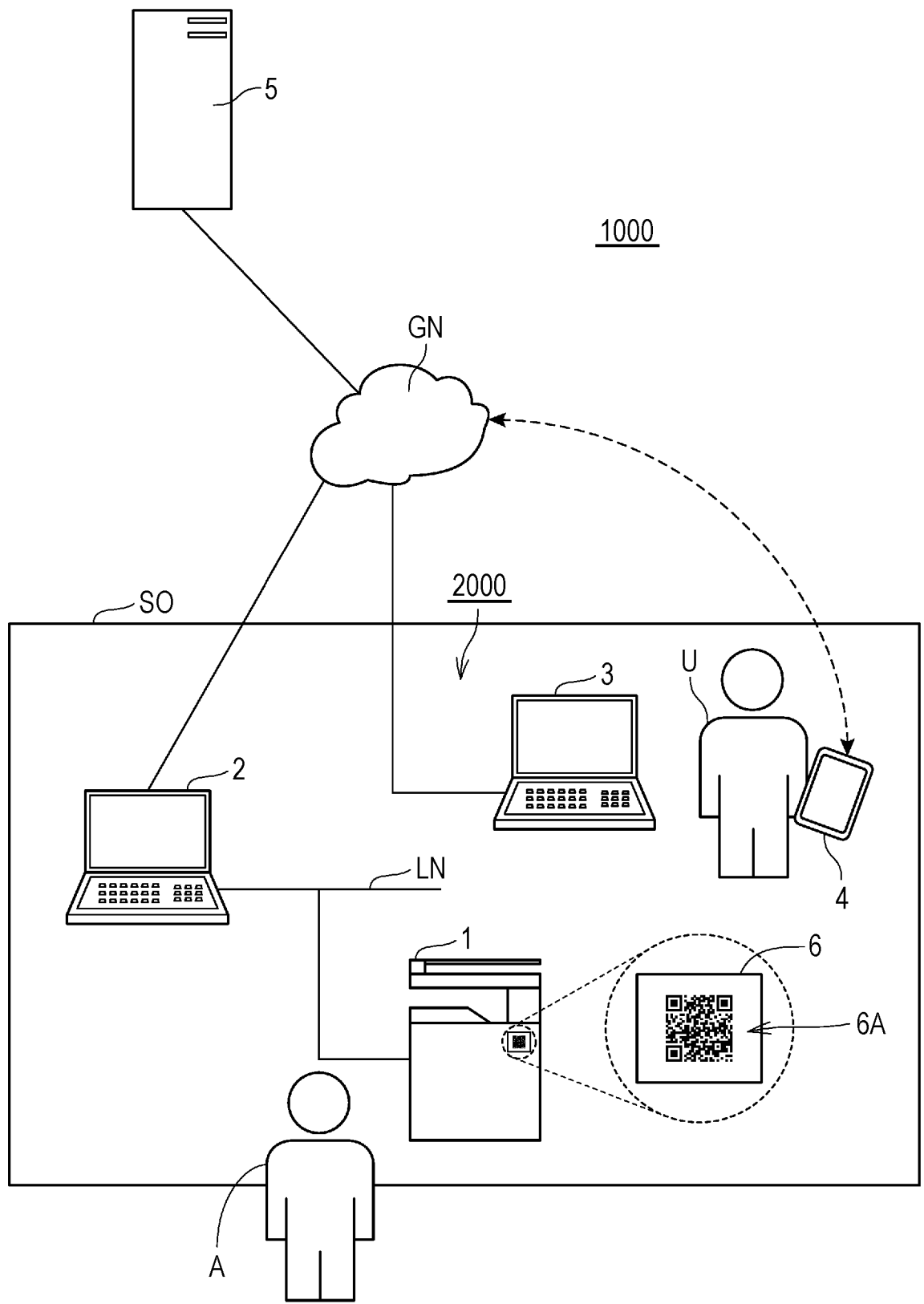
FIG. 1 is a diagram illustrating a configuration of a printing system.

FIG. 1 illustrates a configuration of a printing system 1000.

The printing system 1000 corresponds to an example of an image processing system.

As illustrated in FIG. 1, the printing system 1000 includes an office system 2000. FIG. 1 illustrates a case where the printing system 1000 includes one office system 2000. The printing system 1000 may include two or more office systems 2000.

The office system 2000 is a system used in an office. FIG. 1 illustrates a case where the office system 2000 is used in a shared office SO in which multiple enterprises and individuals share a working environment. The printing system 1000 is applicable not only to the shared office SO but also to other facilities and locations in which people share such an environment.

A printer 1 is provided to the shared office SO that applies the office system 2000. A user U who uses the shared office SO can conduct printing with the printer 1 provided to the shared office SO.

The printer 1 corresponds to an example of an image processing device.

An administrator A installs the printer 1 on the shared office SO. The administrator A is a subject who administers the printer 1. Although FIG. 1 illustrates a person as the administrator A, the administrator A may be a subject other than a person, such as an enterprise, that operates the shared office SO.

The office system 2000 includes the printer 1 and an office PC 2. The PC stands for a personal computer. The printer 1 and the office PC 2 are connected to a local network LN provided to the office system 2000.

The office PC 2 corresponds to an example of a control device.

The printer 1 is a device that prints an image on a print medium. There are no restrictions for the type of the print medium. Examples of the print medium include cut paper, rolled paper, a synthetic resin sheet, and the like in predetermined sizes. There are no restrictions for a printing method adopted by the printer 1, and various printing methods including a dot impact method, a heat sublimation method, and a thermal method are applicable. This embodiment will depict an example in which the printing method adopted by the printer 1 is an ink jet method.

A QR tag 6 on which a QR code (registered trademark) 6A being a two-dimensional code is printed is attached to a predetermined position of a casing of the printer 1 installed in the shared office SO. The QR code 6A records a printer ID 5143 of the printer 1 to which the QR tag 6 is attached. The printer ID 5143 is identification information on the printer 1.

The printer ID 5143 corresponds to an example of identification information on the image processing device.

A near field communication (NFC) tag may be attached to the printer 1 installed in the shared office SO instead of or together with the QR tag 6. In this case, the NFC tag records the printer ID 5143 of the printer 1 to which the NFC tag is attached.

Although FIG. 1 illustrate a notebook PC as the office PC 2, the office PC 2 may be a desktop PC or a tablet PC. The office PC 2 is connected to a global network GN. The global network GN encompasses the Internet, a telephone network, and other communication networks. A printer driver is installed on the office PC 2. The printer driver has a function to generate print data in compliance with a command system of the printer 1 connected to the office PC 2.

This printer driver will be hereinafter referred to as an "office PC driver" and denoted by a reference sign "211".

The global network GN corresponds to an example of a network.

While FIG. 1 illustrates the case in which the office system 2000 includes the printer 1, the office system 2000 may include one or more printers of the same type as or a different type from the printer 1 in addition to the printer 1. A tag similar to the QR tag 6 or the NFC tag attached to the printer 1 is attached to such a different printer. A printer ID recorded on the tag attached to the different printer is different from the printer ID 5143 for the printer 1. When the different printer is provided, a different printer driver for generating print data to be outputted to the different printer is installed on the office PC 2.

The printing system 1000 includes a user PC 3.

The user PC 3 is a PC personally employed by the user U who uses the shared office SO. Although FIG. 1 illustrates a notebook PC as the user PC 3, the user PC 3 may be a tablet PC instead. The user PC 3 is connected to the global network GN. The user PC 3 may be connected to the global network GN through the local network LN provided to the office system 2000 or connected to the global network GN through a network other than the local network LN. A printer driver is installed on the user PC 3.

This printer driver will be hereinafter referred to as a "user PC driver" and denoted by a reference sign "312". The user PC driver 312 may be a printer driver not compatible with the printer 1.

The printing system 1000 includes a smartphone 4.

The smartphone 4 may be a smartphone owned by the user U or a smartphone that is lent to the user U by an enterprise that the user U works for. The smartphone 4 is connected to the global network GN. An application program for performing printing in the shared office SO is installed on the smartphone 4. The smartphone 4 corresponds to an example of a mobile terminal.

This application program will be hereinafter referred to as a "printing application" and denoted by a reference sign "411".

The printing system 1000 includes a management server 5.

The management server 5 is a server device which is connected to the global network GN, and executes prescribed computation processing triggered by a request or the like from each client connected to the global network GN. Each of the office PC 2, the user PC 3, and the smartphone 4 corresponds to such a client. The management server 5 transmits data based on a result of the computation processing to the client as needed. While the accompanying drawings illustrate the management server 5 by using a single block, this illustration does not necessarily mean that the management server 5 is formed from a single server device. The management server 5 may include two or more server devices. The mode of the management server 5 is not questioned as long as the management server 5 has a configuration that can execute a variety of processing to be described later.

Figure 2:
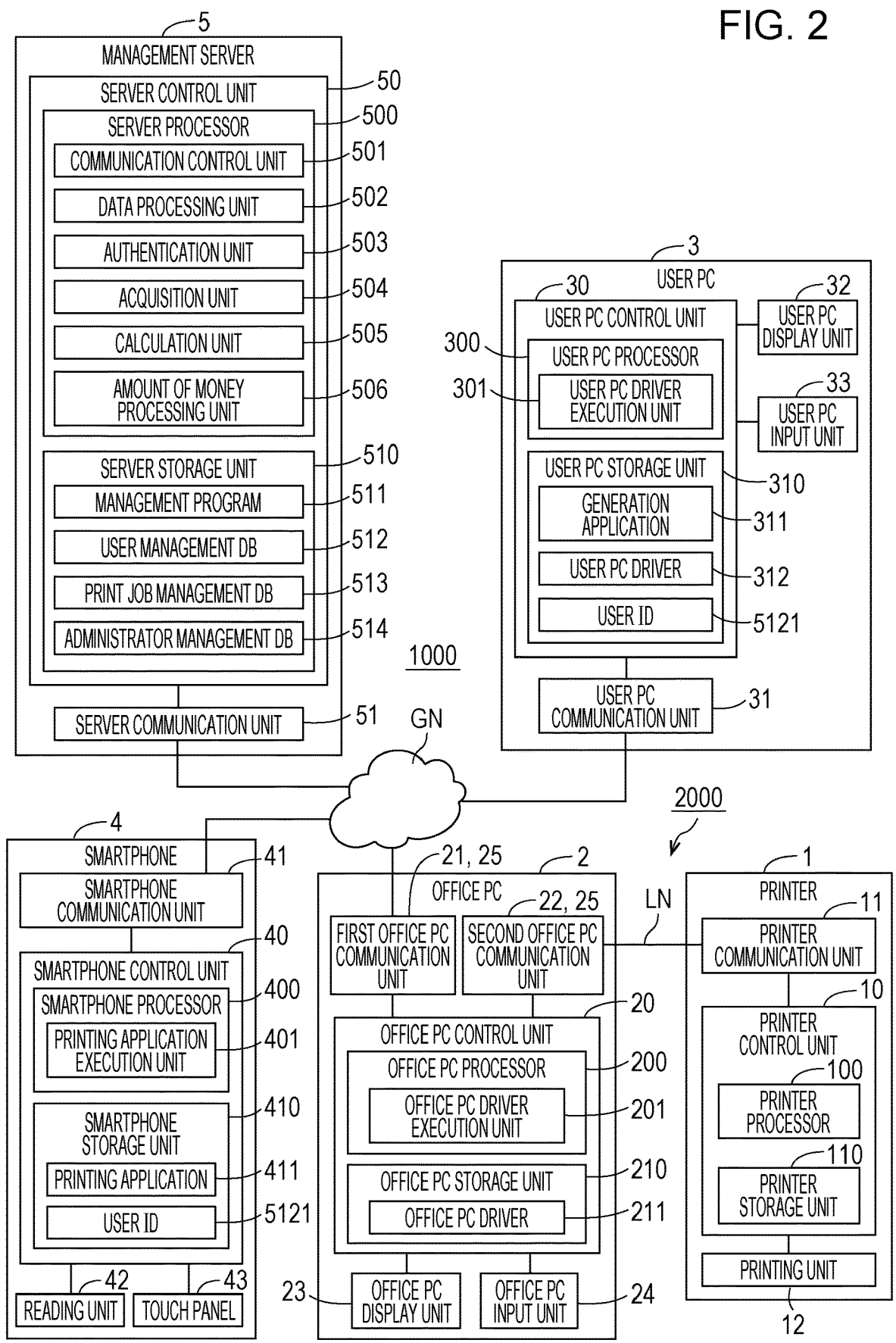
FIG. 2 is a diagram illustrating configurations of devices in the printing system.

FIG. 2 illustrates functional configurations of the respective devices in the printing system 1000.

The printer 1 includes a printer control unit 10, a printer communication unit 11, and a printing unit 12.

The printer communication unit 11 corresponds to an example of an image processing device connection unit.

The printer control unit 10 includes a printer processor 100, which is a processor such as a central processing unit (CPU) and a micro-processing unit (MPU) that executes programs, and a printer storage unit 110. The printer control unit 10 controls respective units in the printer 1. The printer processor 100 reads programs stored in the printer storage unit 110, and the printer control unit 10 executes a variety of processing by using hardware and software.

The printer storage unit 110 stores the programs to be executed by the printer processor 100 and data to be processed by the printer processor 100. The printer storage unit 110 includes a non-volatile storage area. The printer storage unit 110 may include a volatile storage area and form a work area for the printer processor 100.

The printer communication unit 11 is a communication interface in compliance with prescribed communication standards. The printer communication unit 11 communicates with the office PC 2 in accordance with the control of the printer control unit 10.

The printing unit 12 includes a printing mechanism that prints an image on the print medium. The printing unit 12 includes a print head that ejects an ink, and a transportation mechanism that transports the print medium. The printing unit 12 may include various sensors for detecting a position and a size of the print medium, a head scanning mechanism for causing the print head to perform scanning, and so forth.

The office PC 2 includes an office PC control unit 20, a first office PC communication unit 21, a second office PC communication unit 22, an office PC display unit 23, and an office PC input unit 24. The first office PC communication unit 21 and the second office PC communication unit 22 are referred to as office PC communication units 25 when making no distinction. Each office PC communication unit 25 corresponds to an example of a communication unit.

The office PC control unit 20 includes an office PC processor 200, which is a processor such as a CPU and an MPU that executes programs, and an office PC storage unit 210. The office PC control unit 20 controls respective units in the office PC 2. The office PC processor 200 reads programs stored in the office PC storage unit 210, and the office PC control unit 20 executes a variety of processing by using hardware and software. The office PC control unit 20 executes the office PC driver 211 stored in the office PC storage unit 210, thus functioning as an office PC driver execution unit 201.

The office PC storage unit 210 stores the programs to be executed by the office PC processor 200, the office PC driver 211, and data to be processed by the office PC processor 200. The office PC storage unit 210 includes a non-volatile storage area. The office PC storage unit 210 may include a volatile storage area and form a work area for the office PC processor 200.

The first office PC communication unit 21 is a communication interface in compliance with prescribed communication standards. The first office PC communication unit 21 communicates with the management server 5 connected through the global network GN in accordance with the control of the office PC processor 200.

The second office PC communication unit 22 is a communication interface in compliance with prescribed communication standards. The second office PC communication unit 22 communicates with the connected printer 1 in accordance with the control of the office PC control unit 20.

The office PC display unit 23 is a display device that displays information in accordance with the control of the office PC control unit 20. The office PC display unit 23 may be an external display unit provided separately from the office PC 2.

The office PC input unit 24 is an input interface, which is connected to an operating switch provided to the office PC 2 and to an input device such as a panel provided with a touch input function, a mouse, and a keyboard, detects an operation of the input unit by a user, and outputs a result of detection to the office PC control unit 20. The office PC control unit 20 executes processing corresponding to the operation of the input device based on the input from the office PC input unit 24.

The user PC 3 includes a user PC control unit 30, a user PC communication unit 31, a user PC display unit 32, a user PC input unit 33.

The user PC control unit 30 includes a user PC processor 300, which is a processor such as a CPU and an MPU that executes programs, and a user PC storage unit 310. The user PC control unit 30 controls respective units in the user PC 3. The user PC processor 300 reads programs stored in the user PC storage unit 310, and the user PC control unit 30 executes a variety of processing by using hardware and software. The user PC processor 300 executes the user PC driver 312 stored in the user PC storage unit 310. Thus, the user PC control unit 30 functions as a user PC driver execution unit 301.

The user PC storage unit 310 stores the programs to be executed by the user PC processor 300 and data to be processed by the user PC processor 300. The user PC storage unit 310 stores a generation application 311, the user PC driver 312, a user ID 5121, and various other data. The user PC storage unit 310 includes a non-volatile storage area. The user PC storage unit 310 may include a volatile storage area and form a work area for the user PC processor 300.

The generation application 311 is an application program that generates a print job 5132 to print a document, an image, and the like.

The print job 5132 corresponds to an example of processing data.

The user PC communication unit 31 is a communication interface in compliance with prescribed communication standards. The user PC communication unit 31 communicates with the management server 5 through the global network GN in accordance with the control of the user PC control unit 30.

The user PC display unit 32 is a display device that displays information in accordance with the control of the user PC control unit 30.

The user PC input unit 33 is an input interface, which is connected to an operating switch provided to the user PC 3 and an input device such as a panel provided with a touch input function, a mouse, and a keyboard, detects an operation of the input unit by the user, and outputs a result of detection to the user PC control unit 30. The user PC control unit 30 executes processing corresponding to the operation of the input device based on the input from the user PC input unit 33.

The smartphone 4 includes a smartphone control unit 40, a smartphone communication unit 41, a reading unit 42, and a touch panel 43.

The smartphone control unit 40 includes a smartphone processor 400, which is a processor such as a CPU and an MPU that executes programs, and a smartphone storage unit 410. The smartphone control unit 40 controls respective units in the smartphone 4. The smartphone storage unit 410 corresponds to an example of a storage unit. The smartphone processor 400 reads programs stored in the smartphone storage unit 410, and the smartphone control unit 40 executes a variety of processing by using hardware and software. The smartphone processor 400 executes the printing application 411 stored in the smartphone storage unit 410. Thus, the smartphone control unit 40 functions as a printing application execution unit 401.

The smartphone storage unit 410 stores the programs to be executed by the smartphone processor 400 and data to be processed by the smartphone processor 400. The smartphone storage unit 410 stores the printing application 411, the user ID 5121, and various other data. The smartphone storage unit 410 includes a non-volatile storage area. The smartphone storage unit 410 may include a volatile storage area and form a work area for the smartphone processor 400.

The smartphone communication unit 41 is a communication interface in compliance with prescribed communication standards. The smartphone communication unit 41 communicates with the management server 5 through the global network GN in accordance with the control of the smartphone control unit 40.

The reading unit 42 includes at least one of a camera and an NFC module. The reading unit 42 reads information recorded on the tag such as the QR tag and the NFC tag, and outputs the read data to the smartphone control unit 40.

The touch panel 43 includes a display panel such as a liquid crystal display panel and an organic electroluminescence (EL) display panel, and a touch sensor which laps over or is integrated with the display panel. The display panel displays various images under control of the smartphone control unit 40. The touch sensor detects a touch operation and outputs the touch operation to the smartphone control unit 40. The smartphone control unit 40 executes processing corresponding to the touch operation based on the input from the touch sensor.

The management server 5 includes a server control unit 50 and a server communication unit 51.

The server communication unit 51 corresponds to an example of a server connection unit and an example of a connection unit.

The server control unit 50 includes a server processor 500, which is a processor such as a CPU and an MPU that executes programs, and a server storage unit 510. The server control unit 50 controls respective units in the management server 5. The server processor 500 reads programs stored in the server storage unit 510, and the server control unit 50 executes a variety of processing by using hardware and software. The server processor 500 executes a management program 511 stored in the server storage unit 510. Thus, the server control unit 50 functions as a communication control unit 501, a data processing unit 502, an authentication unit 503, an acquisition unit 504, a calculation unit 505, and an amount of money processing unit 506.

The server processor 500 corresponds to an example of a computer. The server storage unit 510 corresponds to an example of a storage unit. The communication control unit 501 corresponds to an example of an output unit.

The server storage unit 510 stores the programs to be executed by the server processor 500 and data to be processed by the server processor 500. The server storage unit 510 stores the management program 511, a user management DB 512, a print job management DB 513, an administrator management DB 514, and various other data. Here, each DB represents a database. The server storage unit 510 includes a non-volatile storage area. The server storage unit 510 may include a volatile storage area and form a work area for the server processor 500.

The management program 511 is a program used for carrying out information processing concerning the printer 1 installed in the shared office SO.

Figure 3:
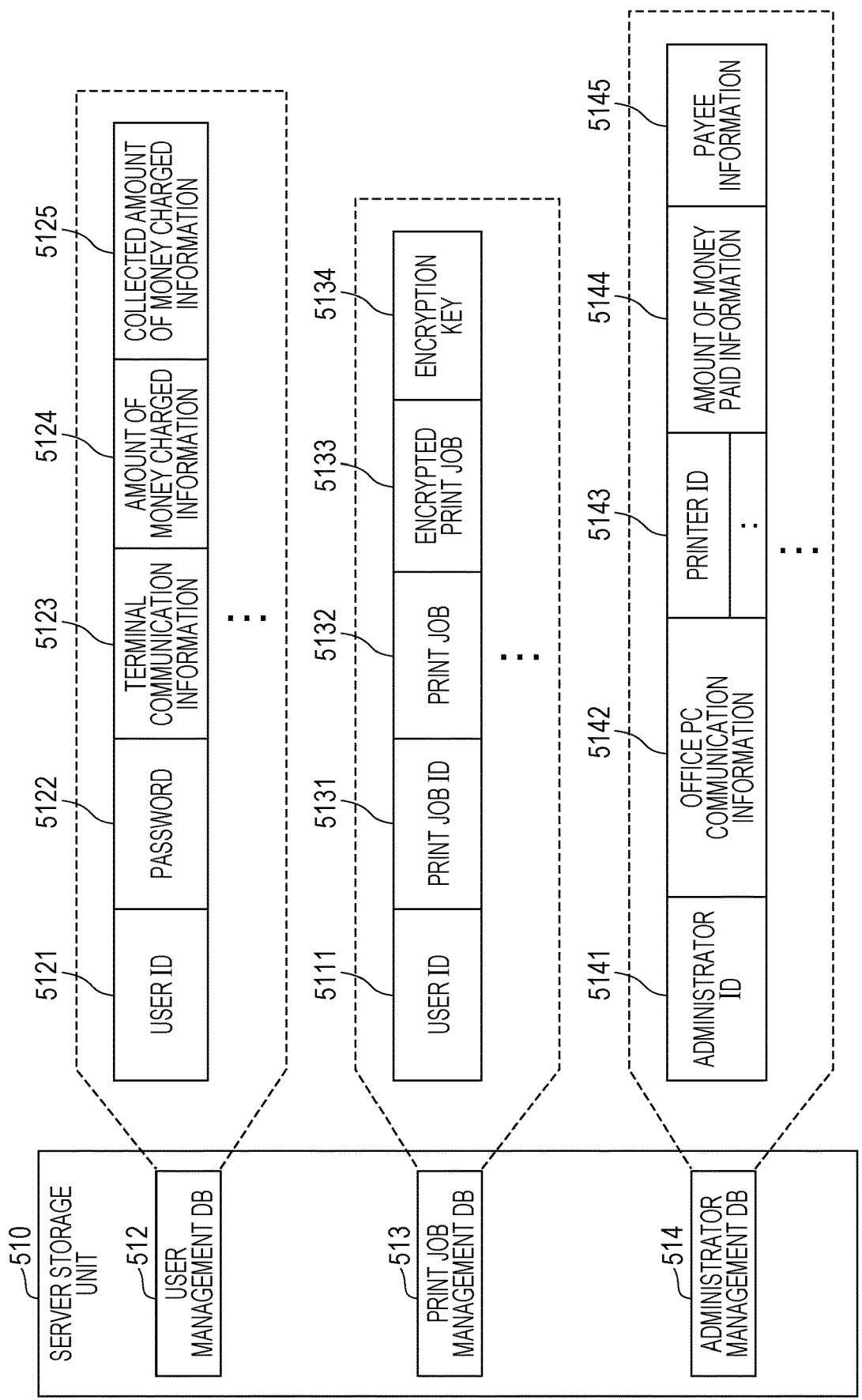
FIG. 3 is a diagram illustrating examples of databases stored in a server storage unit.

FIG. 3 illustrates examples of the respective databases stored in the server storage unit 510.

The user management DB 512 is a database that manages information concerning the user U who uses the printing system 1000. One record stored in the user management DB 512 includes the user ID 5121, a password 5122, terminal communication information 5123, amount of money charged information 5124, and collected amount of money charged information 5125. Such a record stored in the user management DB 512 will be hereinafter referred to as a user record. The user record may include other information such as information on a department that the user belongs to.

The user ID 5121 is identification information for identifying the user U. The user ID 5121 may be generated when the user U establishes connection to the management server 5 by using the user PC 3. The user ID 5121 may be generated as the identification for identifying the user who uses the printing application 411, when the user U uses the printing application 411 installed on the smartphone 4. When the user U generates the user ID 5121 with the printing application 411, the user ID 5121 is generated for each user who uses the printing application 411.

The password 5122 is a password used for authentication of the user U. The password 5122 may be a password set up by the user U or a password set up by the management server 5.

The terminal communication information 5123 is communication information that is used when the management server 5 transmits information to the smartphone 4 on which the printing application 411 is installed. Examples of the terminal communication information 5123 include terminal-specific information used for identifying the smartphone 4 as the terminal, an IP address of the smartphone 4, a MAC address, and so forth.

The amount of money charged information 5124 is information indicating an amount of money charged for the printing with the printer 1.

The collected amount of money charged information 5125 is information which is used in the case of collecting an amount of money charged indicated by the amount of money charged information 5124 linked with the user record from the user U indicated by the user ID 5121 linked with the user record. Examples of the collected amount of money charged information 5125 include information indicating a bank account, information indicating a card number of a credit card, information indicating an amount of deposit in a case where the user U deposits a certain amount of money in advance. The collected amount of money charged information 5125 may vary depending on the users or may be shared by users who belong to the same enterprise, the same group, and the like.

The print job management DB 513 is a database that manages information concerning the print job 5132. One record stored in the print job management DB 513 includes the user ID 5121, a print job ID 5131, the print job 5132, an encrypted print job 5133, and an encryption key 5134. Such a record in the print job management DB 513 will be hereinafter referred to as a print job record. The print job record may include other information.

The print job ID 5131 is job identification information for identifying the print job 5132.

The print job 5132 included in the print job record is the print job 5132 obtained by causing the user PC driver 312 to convert a data format of the print job 5132 generated by the generation application 311 into a prescribed data format. The Portable Document Format (PDF) is an example of the prescribed data format.

The encrypted print job 5133 is print data obtained by encrypting the print job 5132 linked with the print job record in accordance with a prescribed encryption technique.

The encryption key 5134 is data used for decrypting the encrypted print job 5133 linked with the print job record.

The administrator management DB 514 is a database that manages information concerning the administrator A. One record stored in the administrator management DB 514 includes an administrator ID 5141, office PC communication information 5142, the printer ID 5143, amount of money paid information 5144, and payee information 5145. Such a record stored in the administrator management DB 514 will be hereinafter referred to as an administrator record.

The administrator ID 5141 is identification information for identifying the administrator A. The administrator ID 5141 is allocated to each administrator A.

The administrator ID 5141 corresponds to an example of administrator information.

The office PC communication information 5142 is communication information which is used in the case of transmitting the information to the office PC 2 in the shared office SO where the printer 1 indicated by the printer ID 5143 linked with the administrator ID 5141 is installed. The office PC communication information 5142 is communication information concerning communication with the office PC 2 such as an IP address of the office PC 2 and PC identification information for identifying the office PC 2.

When the administrator A indicated by the administrator ID 5141 administers two or more printers 1, multiple printer IDs 5143 are included in one administrator record. The server storage unit 510 stores the administrator management DB 514, thereby linking the printer IDs 5143 with the administrator ID 5141 and storing the printer IDs 5143 and the administrator ID 5141.

The amount of money paid information 5144 is information indicating an amount of money paid to the administrator A involved in the administration of the printer 1.

The payee information 5145 is information indicating a payee of the amount of money paid indicated by the amount of money paid information 5144 linked with the administrator ID 5141. One or more pieces of the payee information 5145 may be linked with the administrator ID 5141 in the administrator record. Examples of the payee information 5145 include a bank account of the administrator A, and the like.

Back to the description of FIG. 2, the server communication unit 51 is a communication interface in compliance with prescribed communication standards. The server communication unit 51 communicates with the devices connected to the global network GN in accordance with the control of the server control unit 50. The server communication unit 51 communicates with the office PC 2, the user PC 3, and the smartphone 4.

A description will be given of operations of the printing system 1000 to be carried out before the user U causes the printer 1 installed in the shared office SO to execute the printing.

At a seat in the shared office SO where the user U is working, the user U instructs the user PC 3 to execute the printing. When the user U moves to the printer 1, the user U causes the printer 1 to execute the printing by using the smartphone 4.

Figure 4:
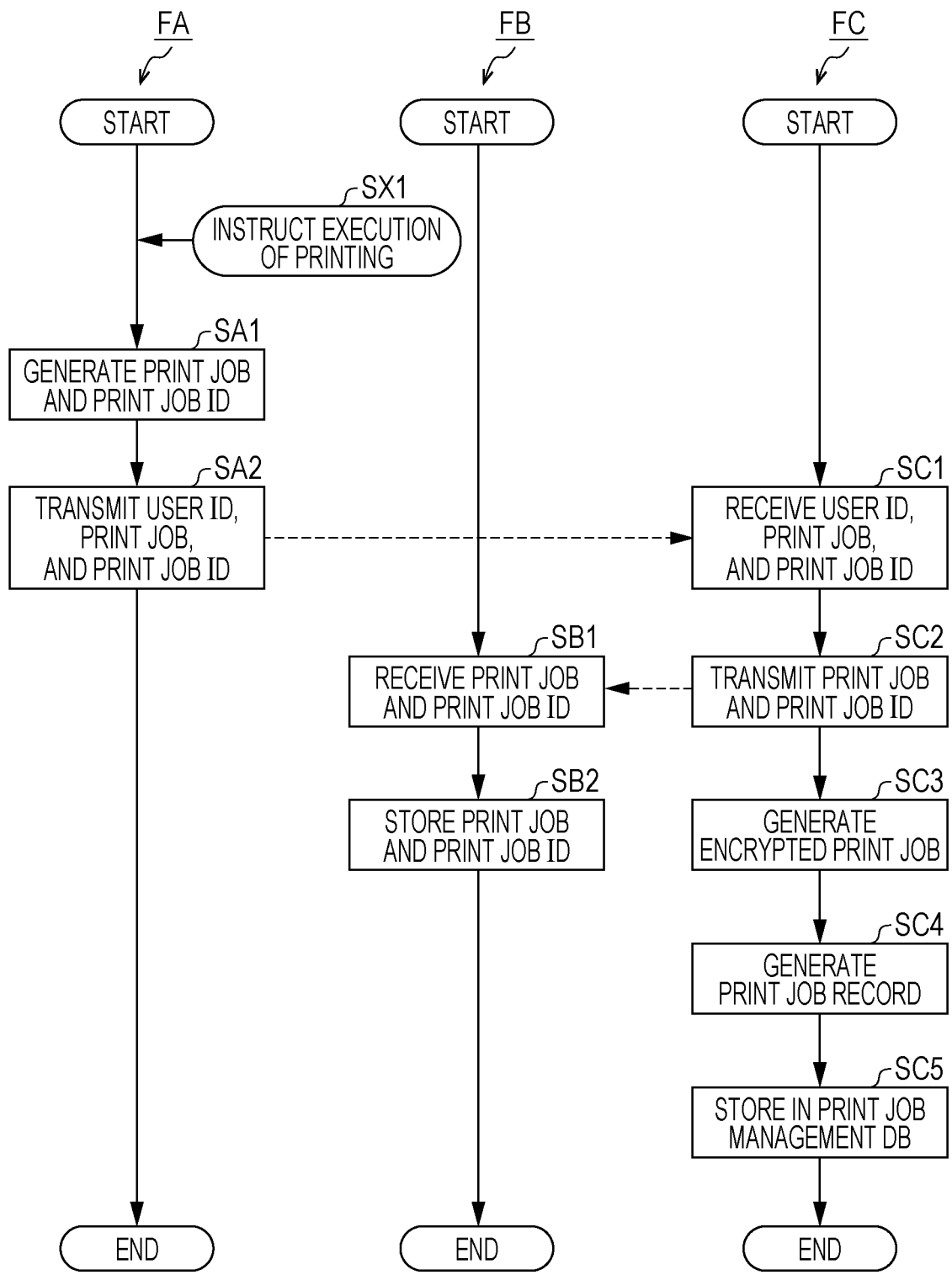
FIG. 4 illustrates flowcharts of operations of the printing system.

FIG. 4 illustrates flowcharts of the operations of the printing system 1000.

In FIG. 4, a flowchart FA illustrates an operation of the user PC 3, a flowchart FB illustrates an operation of the smartphone 4, and a flowchart FC illustrates an operation of the management server 5.

When the user U instructs the user PC 3 to execute the printing by operating the user PC 3 (step SX1), the user PC driver execution unit 301 generates the print job 5132 by converting the print job 5132 generated by the generation application 311 into the prescribed data format, and the print job ID 5131 for identifying the print job 5132 (step SA1).

The user PC driver execution unit 301 adds the user ID 5121 stored in the user PC storage unit 310 and adds the generated print job ID 5131 to the generated print job 5132, and transmits this print job 5132 to the management server 5 by using the user PC communication unit 31 (step SA2).

As illustrated in the flowchart FC, the communication control unit 501 of the management server 5 causes the server communication unit 51 to receive the print job 5132 to which the user ID 5121 and the print job ID 5131 are added (step SC1).

After the server communication unit 51 receives the print job 5132, the communication control unit 501 refers to the user management DB 512 and causes the server communication unit 51 to transmit the received print job 5132 to the smartphone 4 based on the terminal communication information 5123 corresponding to the received user ID 5121 (step SC2). The print job ID 5131 received in step SC1 is added to the print job 5132 to be transmitted to the smartphone 4.

As illustrated in the flowchart FB, the printing application execution unit 401 of the smartphone 4 causes the smartphone communication unit 41 to receive the print job 5132 to which the print job ID 5131 is added (step SB1).

After receiving the print job 5132 to which the print job ID 5131 is added, the printing application execution unit 401 links the print job ID 5131 with the print job 5132 thus received, and stores the print job ID 5131 and the print job 5132 in the smartphone storage unit 410 (step SB2).

By causing the smartphone 4 to receive and store the print job 5132, the user U can perform browsing, editing, and the like of the received print job 5132 with the printing application 411 installed on the smartphone 4.

Back to the description of the flowchart FC, the data processing unit 502 of the management server 5 encrypts the received print job 5132, thus generating the encrypted print job 5133 (step SC3).

After generating the encrypted print job 5133, the data processing unit 502 generates the print job record (step SC4). The print job record to be generated in step SC4 includes the user ID 5121, the print job ID 5131, and the print job 5132 which are received in step SC1, the encrypted print job 5133 generated in step SC3, and the encryption key 5134 for decrypting the encrypted print job 5133.

After generating the print job record, the data processing unit 502 stores the generated print job record in the print job management DB 513 (step SC5).

Next, a description will be given of operations of the printing system 1000 in the case of causing the printer 1 to perform the printing based on the print job 5132 transmitted from the office PC 2 to the management server 5 by using the smartphone 4.

Figure 5:
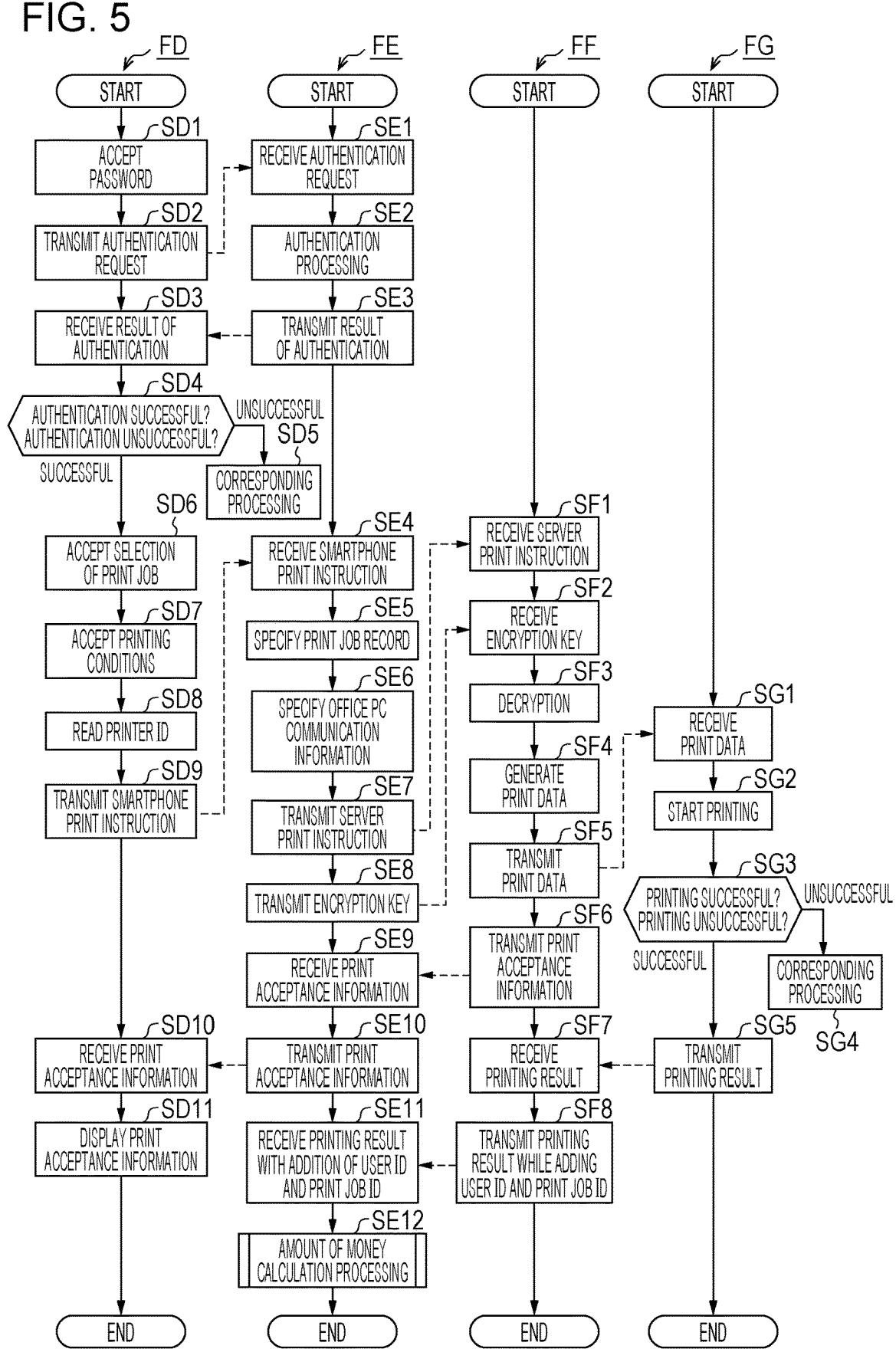
FIG. 5 illustrates flowcharts of operations of the printing system.

FIG. 5 illustrates flowcharts of the operations of the printing system 1000.

In FIG. 5, a flowchart FD illustrates an operation of the smartphone 4, a flowchart FE illustrates an operation of the management server 5, a flowchart FF illustrates an operation of the office PC 2, and a flowchart FG illustrates an operation of the printer 1.

As illustrated in the flowchart FD, the printing application execution unit 401 of the smartphone 4 accepts the password 5122 (step SD1).

After accepting the password 5122, the printing application execution unit 401 transmits an authentication request to the management server 5 by using the smartphone communication unit 41 (step SD2). The authentication request includes the user ID 5121 stored in the smartphone storage unit 410 and the password 5122 accepted in step SD1.

As illustrated in the flowchart FE, the server communication unit 51 receives the authentication request from the smartphone 4 (step SE1).

After the server communication unit 51 receives the authentication request from the smartphone 4, the authentication unit 503 executes authentication processing based on the authentication request received in step SE1 (step SE2).

As the authentication processing, the authentication unit 503 determines whether or not the user record provided with the user ID 5121 included in the authentication request and with the password 5122 is stored in the user management DB 512. When the authentication unit 503 determines that the user record provided with the user ID 5121 included in the authentication request and with the password 5122 is stored in the user management DB 512, the authentication unit 503 judges that the authentication is successful. On the other hand, when the authentication unit 503 determines that the user record provided with the user ID 5121 included in the authentication request and with the password 5122 is not stored in the user management DB 512, the authentication unit 503 judges that the authentication is unsuccessful.

The server communication unit 51 transmits a result of authentication in the authentication processing to the smartphone 4 as a response to the authentication request (step SE3). The result of authentication indicates either successful authentication or unsuccessful authentication.

As illustrated in the flowchart FD, the smartphone communication unit 41 receives the result of authentication from the management server 5 (step SD3).

The printing application execution unit 401 determines whether the received result of authentication indicates successful authentication or unsuccessful authentication (step SD4).

When the printing application execution unit 401 determines that the result of authentication indicates the unsuccessful authentication (step SD4: "unsuccessful"), the printing application execution unit 401 carries out processing corresponding to the unsuccessful authentication (step SD5).

Processing to output an indication of the unsuccessful authentication is an example of the processing corresponding to the unsuccessful authentication in step SD5.

On the other hand, when the printing application execution unit 401 determines that the result of authentication indicates the successful authentication (step SD4: "successful"), the printing application execution unit 401 accepts selection of the print job 5132 by the user U (step SD6).

After the printing application execution unit 401 accepts the selection of the print job 5132 by the user U, the printing application execution unit 401 accepts printing conditions concerning the printing based on the print job 5132 from the user U (step SD7). The printing conditions designated by the user U include pages targeted for printing, the number of printed sheets, a printing mode which is either in color or in black and white, a paper size, a paper type such as plain paper and glossy paper, and so forth.

After the printing application execution unit 401 of the smartphone 4 accepts the printing conditions, the printing application execution unit 401 causes the reading unit 42 to read the printer ID 5143 out of the QR tag 6 (step SD8). The user U captures the QR tag 6 attached to the printer 1 with the reading unit 42 by using the smartphone 4 in which the printing application 411 is activated, and the printing application execution unit 401 reads the printer ID 5143 based on captured data.

After the printing application execution unit 401 reads the printer ID 5143, the smartphone communication unit 41 transmits a smartphone print instruction to the management server 5 (step SD9). The smartphone print instruction is a print instruction to be transmitted from the smartphone 4.

The smartphone print instruction includes the printer ID 5143 read in step SD8, the user ID 5121 stored in the smartphone storage unit 410, the print job ID 5131 linked with the print job 5132 selected in step SD6, and the printing conditions accepted in step SD2.

As illustrated in the flowchart FE, the server communication unit 51 receives the smartphone print instruction (step SE4).

After the server communication unit 51 receives the smartphone print instruction, the communication control unit 501 refers to the print job management DB 513, and specifies the print job record that has the user ID 5121 and the print job ID 5131 included in the received smartphone print instruction (step SE5).

After the communication control unit 501 specifies the print job record, the communication control unit 501 refers to the administrator management DB 514, and specifies the office PC communication information 5142 that is linked with the printer ID 5143 included in the received smartphone print instruction (step SE6).

After the communication control unit 501 specifies the office PC communication information 5142, the server communication unit 51 transmits a server print instruction to the office PC 2 corresponding to the specified office PC communication information 5142 (step SE7). The server print instruction is a print instruction to be transmitted from the management server 5.

The server print instruction to be transmitted in step SE7 includes the user ID 5121 as well as the print job ID 5131 included in the print job record specified in step SE5, the encrypted print job 5133, and the printer ID 5143 as well as the printing conditions included in the smartphone print instruction. Transmission of the encrypted print job 5133 to the office PC 2 corresponds to an example of output of the processing data to the control device.

After the server communication unit 51 transmits the server print instruction, the server communication unit 51 transmits the encryption key 5134 included in the print job record specified in step SE5 to the office PC 2 corresponding to the specified office PC communication information 5142 (step SE8).

A timing to transmit the encrypted print job 5133 only needs to be different from a timing to transmit the encryption key 5134. Moreover, the combinations of the pieces of information to be transmitted in steps SE7 and SE8 are not limited only to the combinations mentioned above. Although the printer ID 5143 is transmitted in step SE7 in the above-described example, the printer ID 5143 may be transmitted in step SE8 instead.

As illustrated in the flowchart FF, the first office PC communication unit 21 of the office PC 2 receives the server print instruction (step SF1).

After the first office PC communication unit 21 receives the server print instruction, the first office PC communication unit 21 receives the encryption key 5134 (step SF2).

The office PC driver execution unit 201 decrypts the encrypted print job 5133 included in the server print instruction received in step SF1 by using the encryption key 5134 received in step SF2 (step SF3).

After the office PC driver execution unit 201 decrypts the encrypted print job 5133, the office PC driver execution unit 201 generates the print data based on the decrypted print job 5132 and on the printing conditions included in the server print instruction received in step SF1 (step SF4).

After the office PC driver execution unit 201 generates the print data, the office PC driver execution unit 201 stores the user ID 5121 and the print job ID 5131 included in the server print instruction received in step SF1, and the second office PC communication unit 22 transmits the generated print data to the printer 1 corresponding to the printer ID 5143 included in the server print instruction received in step SF1 (step SF5).

As illustrated in the flowchart FG, the printer communication unit 11 of the printer 1 receives the print data (step SG1).

The printer control unit 10 causes the printing unit 12 to start printing while controlling the printing unit 12 based on the received print data (step SG2).

Back to the description of the flowchart FF, the office PC driver execution unit 201 generates print acceptance information indicating acceptance of the printing by the smartphone 4, and the first office PC communication unit 21 transmits the print acceptance information to the management server 5 as a response to the server print instruction (step SF6).

As illustrated in the flowchart FE, the server communication unit 51 of the management server 5 receives the print acceptance information (step SE9), and transmits the received print acceptance information to the smartphone 4 as a response to the smartphone print instruction (step SE10).

As illustrated in the flowchart FD, the smartphone communication unit 41 receives the print acceptance information (step SD10), and the smartphone control unit 40 causes the touch panel 43 to display the print acceptance information (step SD11). The print acceptance information to be displayed on the touch panel 43 may be the received print acceptance information or display information obtained by processing the print acceptance information.

Back to the description of the flowchart FG, after the printing unit 12 starts the printing based on the received print data, the printer control unit 10 determines whether the printing is successful or unsuccessful (step SG3).

When the printer control unit 10 determines that the printing is unsuccessful (step SG3: "unsuccessful"), the printer control unit 10 executes processing corresponding to the unsuccessful printing (step SG4). Processing to output an indication of the printing being unsuccessful is an example of the processing corresponding to the unsuccessful printing.

The printer communication unit 11 may transmit a printing result even in the case of the unsuccessful printing, or withhold transmission of the printing result until determination of the successful printing until the printing turns out to be successful when the unsuccessful printing is due to a recoverable factor such as running out of the ink.

On the other hand, when the printer control unit 10 determines that the printing is successful (step SG3: "successful"), the printer communication unit 11 sends the office PC 2 the printing result indicating that the printing is successful (step SG5).

As illustrated in the flowchart FF, after the second office PC communication unit 22 receives the printing result indicating that the printing is successful (step SF7), the printer control unit 10 adds the user ID 5121 and the print job ID 5131 received in step SG1 to the printing result indicating that the printing is successful, and transmits this printing result of the management server 5 by using the first office PC communication unit 21 (step SF8). The printing result includes information indicating at least one of the number of printed sheets printed based on the print job, the paper size, the printing mode which is either in color or in black and white, the paper type such as plain paper and glossy paper, and so forth.

The printing result corresponds to an example of a processing result.

The server communication unit 51 receives the printing result to which the user ID 5121 and the print job ID 5131 are added (step SE11).

After the server communication unit 51 receives the printing result, the server control unit 50 of the management server 5 executes amount of money calculation processing based on the received printing result (step SE12). Examples of the printing result include the pages targeted for printing, the number of printed sheets, the printing mode which is either in color or in black and white, the paper size, the paper type such as plain paper and glossy paper, and so forth.

Figure 6:
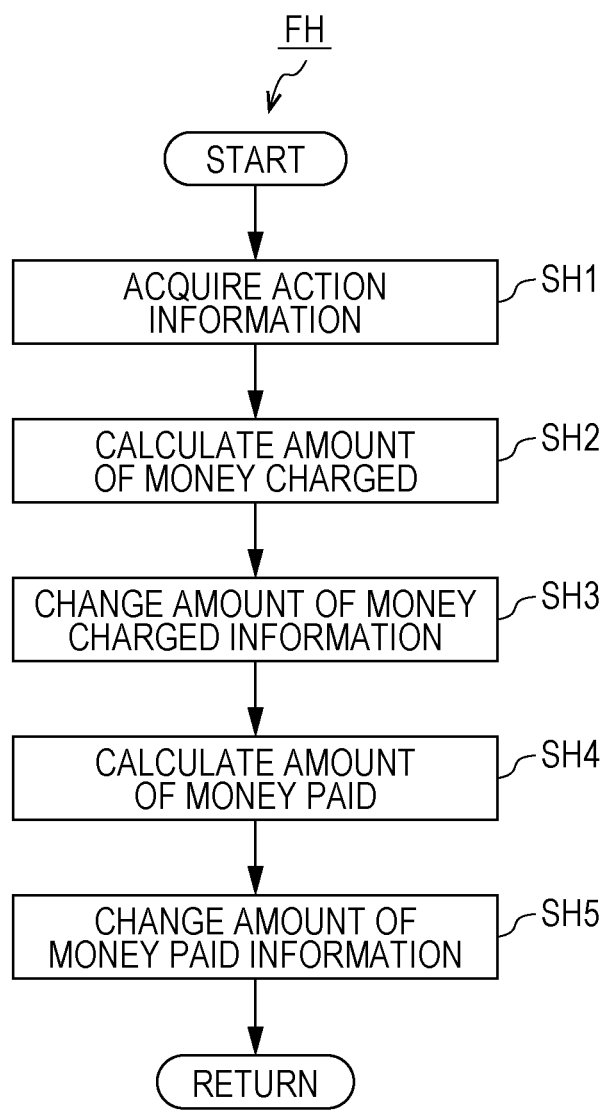
FIG. 6 is a flowchart illustrating an operation of a management server.

FIG. 6 is a flowchart FH illustrating an operation of the management server 5 in the amount of money calculation processing.

The acquisition unit 504 of the management server 5 acquires action information from the printing result received in step SE11 (step SH1).

The action information is information indicating what kind of action the printer 1 carries out at the time of the printing based on the print data. The action information is information indicating an action result of the printer 1 at the time of the printing. Examples of the action information include the number of printed sheets, the printing mode which is either in color or in black and white, the paper size, the paper type such as plain paper and glossy paper, and so forth representing the printing result at the time of the printing based on the print data.

After the acquisition unit 504 of the management server 5 acquires the action information, the calculation unit 505 calculates an amount of money charged to the user U based on the action information acquired by the acquisition unit 504 (step SH2). The calculation unit 505 calculates the amount of money charged regarding each user. When a second user U2 different from the user U uses the printer 1, the calculation unit 505 calculates a second amount of money charged to the second user U2.

For example, when the action information acquired by the acquisition unit 504 represents 100 sheets printed on the plain paper in the paper size A4 in the color printing mode, the calculation unit 505 calculates the amount of money charged which is equal to 3000 yen on the assumption that each sheet costs 30 yen in the case of color printing on the plain paper in the paper size A4.

The data processing unit 502 adds the amount of money charged which is calculated in step SH2 to the amount of money charged indicated by the amount of money charged information 5124 which is linked with the user ID 5121 added to the printing result received in step SE11, and changes the amount of money charged information 5124 with the added amount of money as the amount of money charged (step SH3). When payer information included in the collected amount of money charged information 5125 on the user U is the same as second payer information included in the collected amount of money charged information 5125 on the second user U2, then the amounts of money charged to the user U and the second user U2 may be added up and charged to the payer information.

After the data processing unit 502 changes the amount of money charged information 5124, the calculation unit 505 calculates an amount of money paid to the administrator A based on the action information acquired by the acquisition unit 504 in step SH1 (step SH4). The calculation of the amount of money paid may be carried out based on the same action information as that used in the calculation of the amount of money charged or may be calculated in a different way. The calculation of the amount of money paid may be calculated based on the amount of money charged.

After the calculation unit 505 calculates the amount of money paid to the administrator A, the calculation unit 505 adds the amount of money paid calculated in step SH4 to the amount of money paid indicated by the amount of money paid information 5144 linked with the user ID 5121 added to the printing result received in step SE11, and changes the amount of money paid information 5144 with the added amount of money as the amount of money paid (step SH5).

Figure 7:
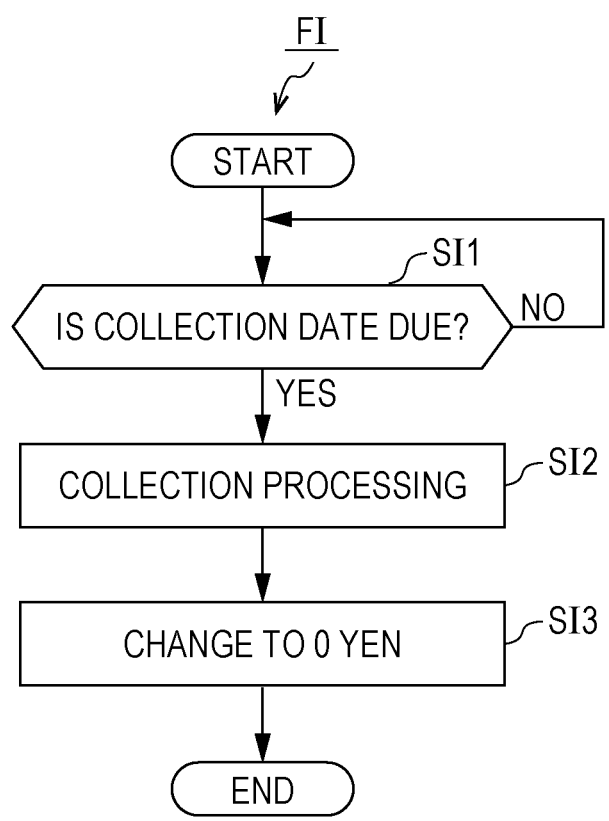
FIG. 7 is a flowchart illustrating an operation of the management server.

FIG. 7 is a flowchart FI illustrating an operation of the management server 5 concerning collection of the amount of money charged.

The operation illustrated in FIG. 7 involves one user record stored in the user management DB 512 as a processing target.

The amount of money processing unit 506 of the management server 5 determines whether or not a collection date of the amount of money charged is due (step SI1). The same collection date may be set to two or more users U or the collection dates may vary among these users U.

The amount of money processing unit 506 carries out the processing in step SI1 again when the amount of money processing unit 506 determines that the collection date of the amount of money charged is not due (step SI1: NO).

On the other hand, when the amount of money processing unit 506 determines that the collection date of the amount of money charged is due (step SI1: YES), the amount of money processing unit 506 carries out collection processing to collect the amount of money charged indicated by the amount of money charged information 5124 linked with the user ID 5121 based on the collected amount of money charged information 5125 that is linked with the user ID 5121 targeted for the processing (step SI2). Examples of the collection processing include processing to debit the amount of money charged from a bank account, processing to debit the amount of money charged through a credit card, and processing to debit the amount of money charged from an amount of money deposited by the user U in advance. The user U is subjected to the collection processing in accordance with one of examples of the processing cited above.

After the amount of money processing unit 506 carries out the collection processing, the data processing unit 502 changes the amount of money charged indicated by the amount of money charged information 5124 linked with the user ID 5121 targeted for the processing to 0 yen (step SI3).

Figure 8:
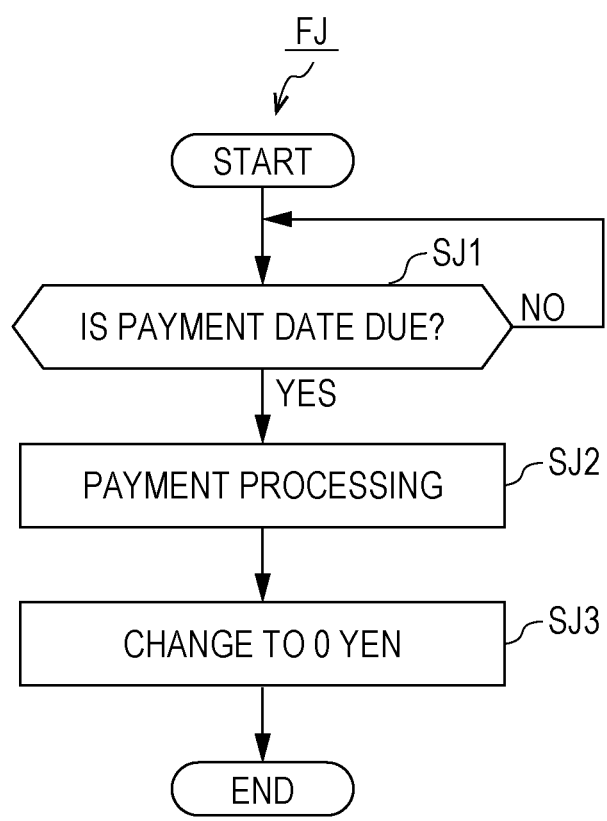
FIG. 8 is a flowchart illustrating an operation of the management server.

FIG. 8 is a flowchart FJ illustrating an operation of the management server 5 concerning payment of the amount of money paid to the administrator A.

The operation illustrated in FIG. 8 involves one administrator record stored in the administrator management DB 514 as a processing target.

The amount of money processing unit 506 of the management server 5 determines whether or not a payment date of the amount of money paid is due (step SJ1). The same payment date may be set to two or more administrators A or the payment dates may vary among these administrators A.

The amount of money processing unit 506 carries out the processing in step SJ1 again when the amount of money processing unit 506 determines that the payment date of the amount of money paid is not due (step SJ1: NO).

On the other hand, when the amount of money processing unit 506 determines that the payment date of the amount of money paid is due (step SJ1: YES), the amount of money processing unit 506 carries out payment processing to pay the amount of money paid indicated by the amount of money paid information 5144 linked with the administrator ID 5141 based on the payee information 5145 that is linked with the administrator ID 5141 (step SJ2). Processing to transfer the amount of money paid to a bank account of the administrator A is an example of the payment processing.

After the amount of money processing unit 506 carries out the payment processing, the data processing unit 502 changes the amount of money paid indicated by the amount of money paid information 5144 linked with the administrator ID 5141 to 0 yen (step SJ3).

The above-described embodiment has the following effects.

As described above, the management server 5 includes the server communication unit 51 connected to the office PC 2 that communicates with the printer 1 through the global network GN, the acquisition unit 504 that acquires the action information on the printer 1 of the user U from the office PC 2 connected to the server communication unit 51, the server storage unit 510 that links the printer ID 5143 with the administrator ID 5141 and stores the printer ID 5143 and the administrator ID 5141, and the calculation unit 505 that calculates the amount of money paid to the administrator A indicated by the administrator ID 5141 linked with the printer ID 5143 of the printer 1 concerning the action information based on the action information acquired by the acquisition unit 504.

The management server 5 can determine the amount of money paid to the administrator A of the printer 1 based on the action information on the printer 1. The use of the determined amount of money paid makes it possible to construct a revenue system concerning administration of the printer 1 by the administrator A.

The management server 5 includes the authentication unit 503 that authenticates the user U of the printer 1. Based on the action information acquired by the acquisition unit 504, the calculation unit 505 calculates the amount of money charged to the user U who is successfully authenticated by the authentication unit 503.

According to this configuration, the amount of money charged is calculated regarding the user U who is successfully authenticated. Hence, it is possible to determine the amount of money charged corresponding to the actual use by the user U. Accordingly, it is possible to collect the amount of money charged from the user U, which corresponds to the actual use by the user U. As a consequence, introduction of the management server 5 to the system provided with the printer 1 makes it possible to construct the system that can properly collect the amount of money charged for the use of the printer 1 from the user U.

The server communication unit 51 of the management server 5 outputs the print job 5132 to be processed by the printer 1. The server communication unit 51 is connected to the office PC 2 to control the printer 1 through the global network GN. The server communication unit 51 outputs the print job 5132 to the office PC 2.

Accordingly, the configuration in which the management server 5 outputs the print job 5132 to the printer 1 enables the management server 5 to output the print job 5132 to the printer 1 through the office PC 2. As a consequence, by installing the printer driver compatible with the printer 1 on the office PC 2, the management server 5 can output the print job 5132 to the printer 1 irrespective of the type of the printer 1. Thus, the system in which the management server 5 outputs the print job 5132 to the printer 1 through the office PC 2 enables the administrator A to gain a revenue concerning the administration of the printer 1 irrespective of the type of the printer 1.

The action information indicates the number of printed sheets printed by the user U of the printer 1. The calculation unit 505 calculates the amount of money paid to the administrator A based on the number of printed sheets acquired by the acquisition unit 504.

In this way, the management server 5 can calculate the amount of money paid to the administrator A based on the number of printed sheets printed by the user U of the printer 1. This enables the administrator A to gain the revenue in accordance with the number of printed sheets and regarding the administration of the printer 1.

The acquisition unit 504 acquires the action information based on the printing result of the printer 1.

This makes it possible to calculate the amount of money paid based on the printing actually conducted by use of the printer 1. Accordingly, the management server 5 can properly calculate the amount of money paid to the administrator A. As a consequence, the administrator A can gain the proper revenue regarding the administration of the printer 1.

The management program 511 is executed by the server processor 500 of the management server 5. The management program 511 causes the server processor 500 to acquire the action information on the printer 1 from the office PC 2 through the global network GN, to link the printer ID 5143 with the administrator ID 5141 and to store the printer ID 5143 and the administrator ID 5141, and to calculate the amount of money paid to the administrator A indicated by the administrator ID 5141 linked with the printer ID 5143 of the printer 1 concerning the action information based on the acquired action information.

In this way, the management program 511 has effects similar to the above-described effects of the management server 5.

The printing system 1000 includes the printer 1, and the management server 5 connected to the printer 1 through the global network GN.

The management server 5 includes the server communication unit 51 connected to the office PC 2 through the global network GN, the acquisition unit 504 that acquires the action information on the printer 1 from the office PC 2 connected to the server communication unit 51, the server storage unit 510 that links the printer ID 5143 with the administrator ID 5141 and stores the printer ID 5143 and the administrator ID 5141, and the calculation unit 505 that calculates the amount of money paid to the administrator A indicated by the administrator ID 5141 linked with the printer ID 5143 of the printer 1 concerning the action information based on the action information acquired by the acquisition unit 504.

The printing system 1000 can determine the amount of money paid to the administrator A of the printer 1 based on the action information on the printer 1. Thus, it is possible to construct the revenue system concerning the administration of the printer 1 by the administrator A.

The printing system 1000 includes the printer 1, the management server 5, and the office PC 2 that controls the printer 1.

The office PC 2 includes the office PC communication unit 25, which receives the print job 5132 from the management server 5, transmits the received print job 5132 to the printer 1, receives the printing result based on the print job 5132 from the printer 1, and transmits the received printing result to the management server 5. The acquisition unit 504 acquires the action information based on the printing result.

In this way, the configuration to cause the management server 5 to output the print job 5132 to the printer 1 enables the management server 5 to output the print job 5132 to the printer 1 through the office PC 2. Accordingly, by installing the printer driver compatible with the printer 1 on the office PC 2, the management server 5 can output the print job 5132 to the printer 1 irrespective of the type of the printer 1. As a consequence, in the system in which the management server 5 outputs the print job 5132 to the printer 1, the administrator A can gain the revenue regarding the administration of the printer 1 irrespective of the type of the printer 1. Moreover, since the amount of money paid can be calculated based on the printing actually conducted by use of the printer 1, the management server 5 can properly calculate the amount of money paid to the administrator A.

Other embodiments will be described below.

Second Embodiment

Next, a second embodiment will be described. In the second embodiment, constituents which are the same as the constituents of the above-described first embodiment will be denoted by the same reference signs and detailed explanations thereof will be omitted.

The above-described first embodiment has the configuration in which the management server 5 transmits the encrypted print job 5133 and the encryption key 5134 to the office PC 2, and the office PC 2 decrypts the encrypted print job 5133 and generates the print data.

The second embodiment has a configuration in which the management server 5 transmits the print job 5132 received from the user PC 3 to the office PC 2, and the office PC 2 generates the print data based on the received print job 5132. In other words, the print job 5132 is not encrypted in the second embodiment.

Since the print job 5132 is not encrypted by the management server 5, one print job record stored in the print job management DB 513 of the second embodiment does not include the encrypted print job 5133 or the encryption key 5134.

Figure 9:
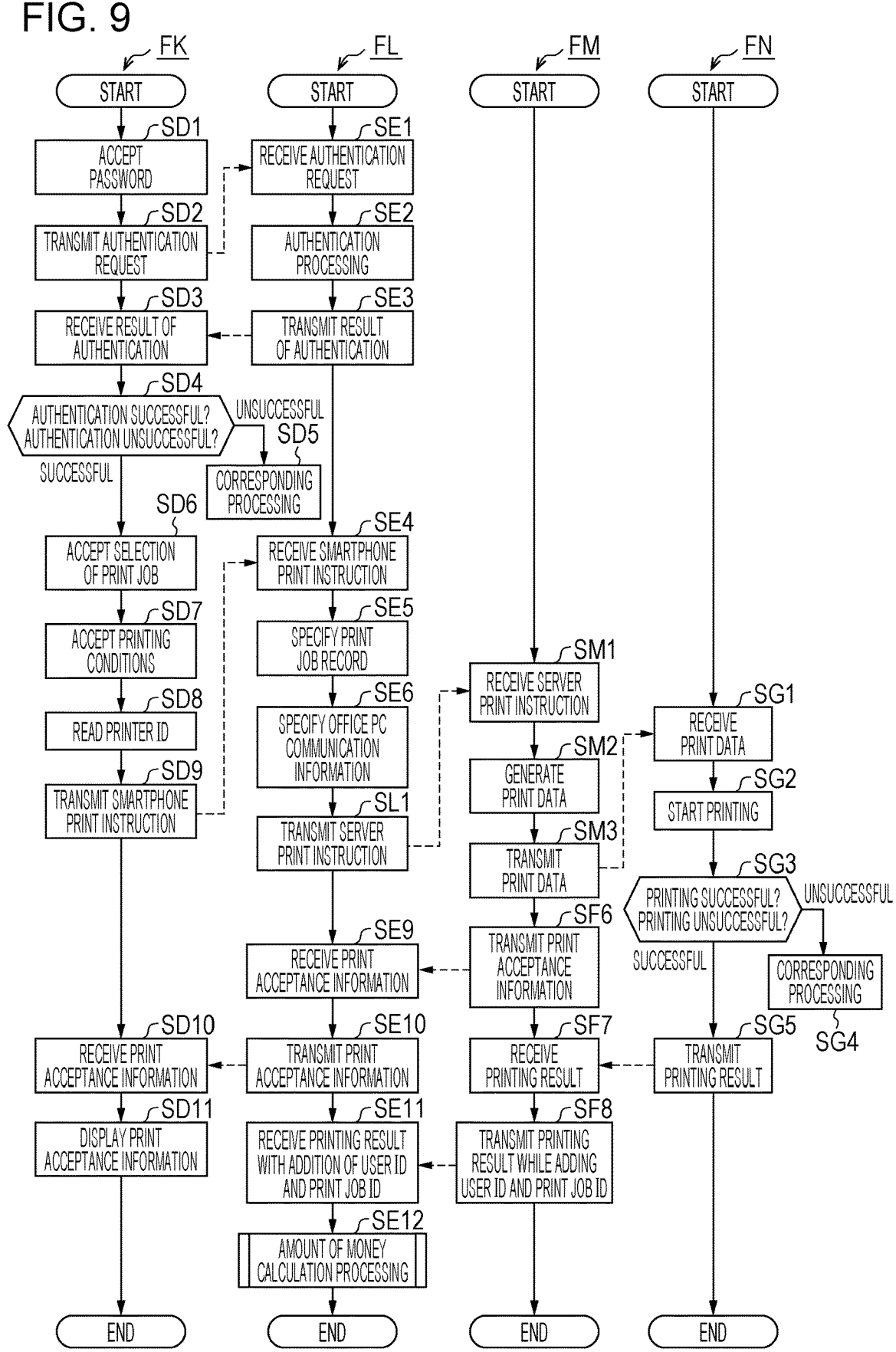
FIG. 9 is a diagram illustrating operations of the printing system.

FIG. 9 illustrates flowcharts of operations of the printing system 1000 in the second embodiment. In FIG. 9, a flowchart FK illustrates an operation of the smartphone 4, a flowchart FL illustrates an operation of the management server 5, a flowchart FM illustrates an operation of the office PC 2, and a flowchart FN illustrates an operation of the printer 1.

In FIG. 9, the same steps as those in the flowcharts illustrated in FIG. 5 will be denoted by the same step numbers and detailed explanations thereof will be omitted.

Note that the operation of the printing system 1000 to the point before the user U performs the printing by using the printer 1, the operation of the management server 5 in the amount of money calculation processing, and the operations of the management server 5 concerning the collection and the payment are the same as those of the first embodiment.

As illustrated in the flowchart FL, the server communication unit 51 transmits the server print instruction to the office PC 2 corresponding to the specified office PC communication information 5142 (step SL1).

The server print instruction to be transmitted from the server communication unit 51 in step SL1 includes the user ID 5121 as well as the print job ID 5131 included in the print job record specified in step SE5, the print job 5132, and the printer ID 5143 as well as the printing conditions included in the smartphone print instruction.

As illustrated in the flowchart FM, the first office PC communication unit 21 receives the server print instruction (step SM1).

After the first office PC communication unit 21 receives the server print instruction, the office PC driver execution unit 201 generates the print data based on the print job 5132 and on the printing conditions included in the server print instruction (step SM2).

After the office PC driver execution unit 201 generates the print data, the second office PC communication unit 22 transmits the generated print data to the printer 1 (step SM3).

The second embodiment has similar effects to those of the first embodiment.

Third Embodiment

Figure 10:
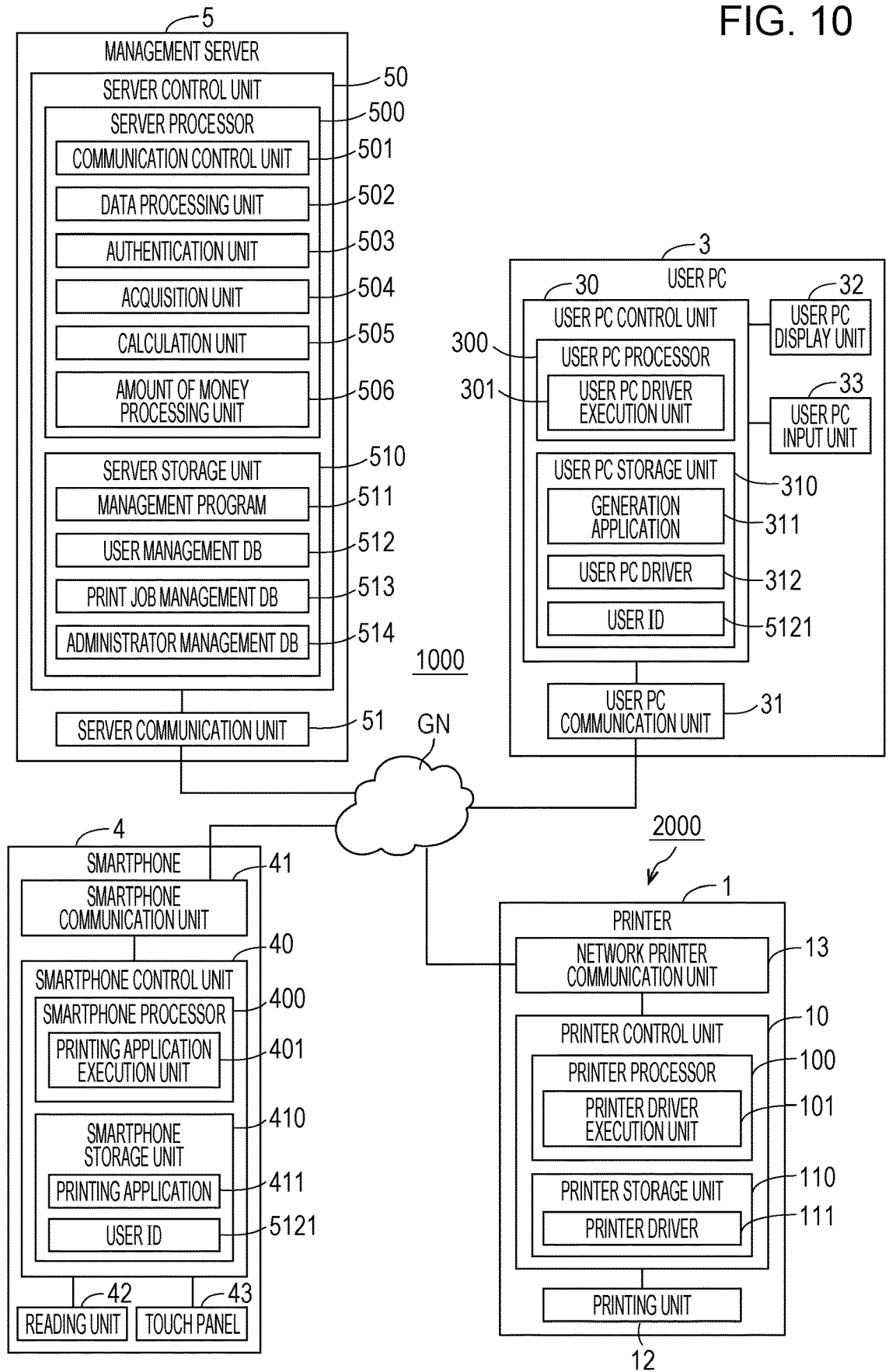
FIG. 10 is a diagram illustrating configuration of the printing system and devices in the printing system.

FIG. 10 illustrates a printing system 1000 according to a third embodiment and configurations of devices in the printing system 1000. In the third embodiment, constituents which are the same as the constituents of the above-described first embodiment will be denoted by the same reference signs and detailed explanations thereof will be omitted.

As apparent from a comparison of FIG. 10 with FIGS. 1 and 2, the printing system 1000 of the third embodiment does not include the office PC 2, and the printer 1 is connected to the global network GN. The printer 1 of the third embodiment has a function corresponding to the office PC driver execution unit 201 out of the functions to be executed by the office PC 2 of the first embodiment.

As illustrated in FIG. 10, the printer 1 of the third embodiment includes a network printer communication unit 13. The printer storage unit 110 of the printer 1 of the third embodiment stores a printer driver 111 which has the same function as that of the office PC driver 211 of the first embodiment. The printer processor 100 executes the printer driver 111, thereby functioning as a printer driver execution unit 101.

In the third embodiment, the network printer communication unit 13 corresponds to an example of the image processing device connection unit.

The network printer communication unit 13 is a communication interface in compliance with prescribed communication standards. The network printer communication unit 13 communicates with the devices connected to the global network GN in accordance with the control of the printer control unit 10. The network printer communication unit 13 communicates with the management server 5.

Figure 11:
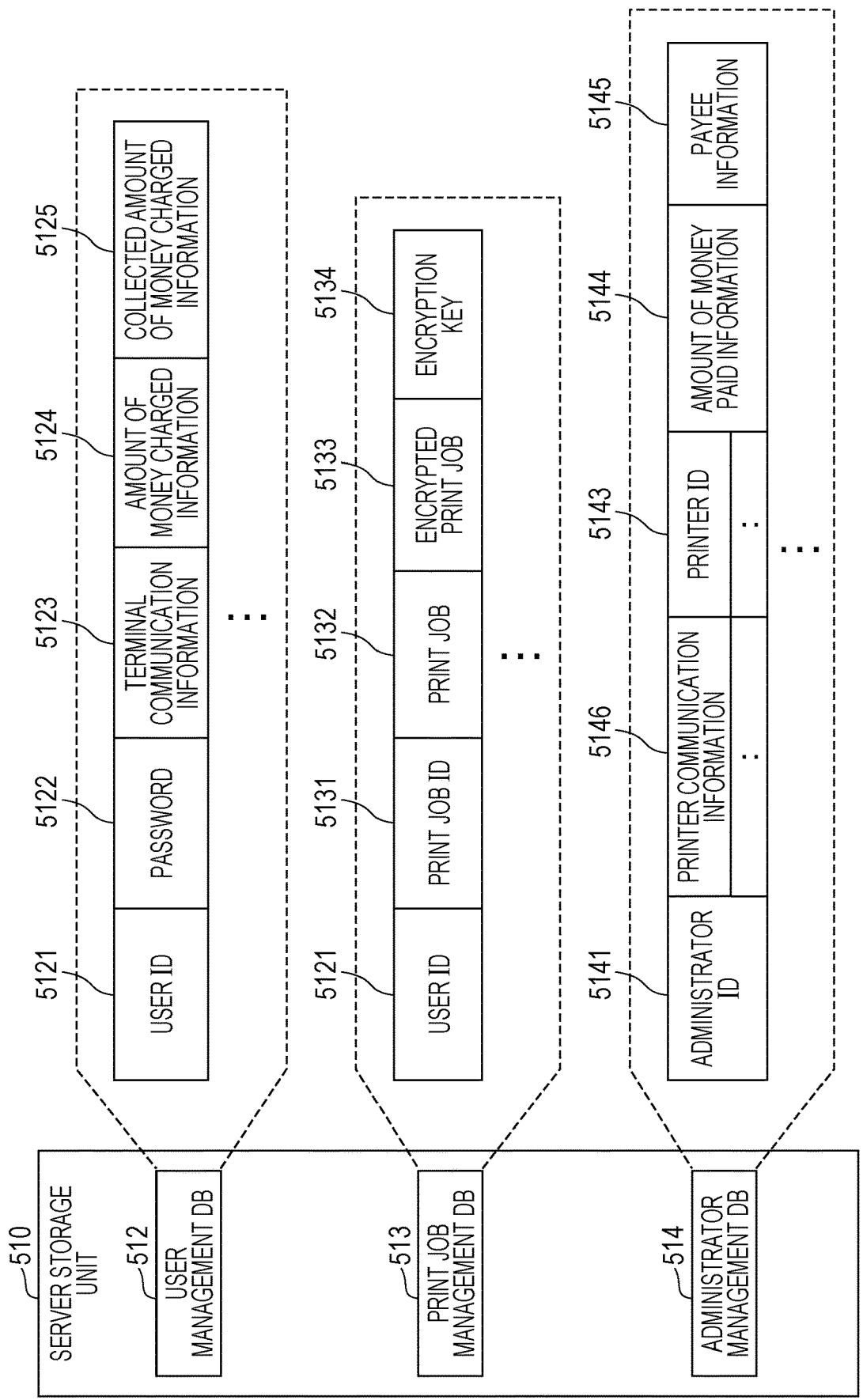
FIG. 11 is a diagram illustrating examples of databases stored in the server storage unit.

FIG. 11 illustrates examples of the respective databases stored in the server storage unit 510 of the third embodiment.

As apparent from a comparison of FIG. 11 with FIG. 3, in the third embodiment, the administrator record stored in the administrator management DB 514 includes printer communication information 5146 but does not include the office PC communication information 5142. The printer communication information 5146 is information used for communication with the printer 1, which is linked with each printer ID 5143 by using the administrator record.

Figure 12:
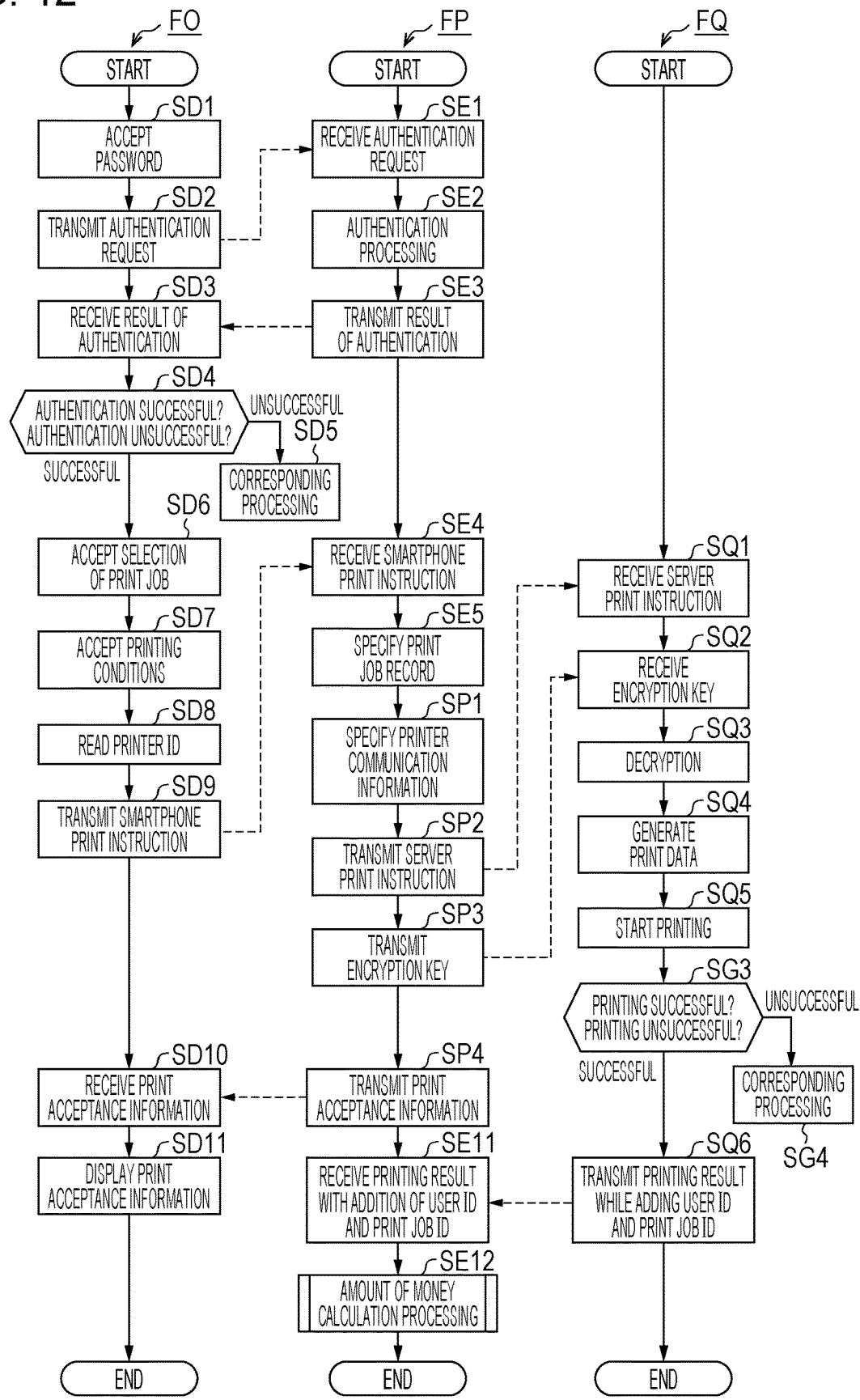
FIG. 12 is a flowchart illustrating operations of the printing system.

FIG. 12 illustrates flowcharts of operations of the printing system 1000 in the third embodiment. In FIG. 12, a flowchart FO illustrates an operation of the smartphone 4, a flowchart FP illustrates an operation of the management server 5, and a flowchart FQ illustrates an operation of the printer 1.

In FIG. 12, the same steps as those in the flowcharts illustrated in FIG. 5 will be denoted by the same step numbers and detailed explanations thereof will be omitted.

The operation of the printing system 1000 during a period from the start of the authentication by the user U with the smartphone 4 to the specification of the print job record by the management server 5, the operation of the management server 5 in the amount of money calculation processing, and the operations of the management server 5 concerning the collection and the payment are the same as those of the first embodiment.

As illustrated in the flowchart FP, the communication control unit 501 of the management server 5 refers to the administrator management DB 514 and specifies the printer communication information 5146 linked with the printer ID 5143 included in the smartphone print instruction received in step SE1 (step SP1).

After the communication control unit 501 specifies the printer communication information 5146, the server communication unit 51 transmits the server print instruction to the printer 1 corresponding to the specified printer communication information 5146 (step SP2).

The server print instruction to be transmitted in step SP2 is the same as the server print instruction to be transmitted in step SE7.

After the server communication unit 51 transmits the server print instruction, the server communication unit 51 transmits the encryption key 5134 included in the print job record specified in step SE5 to the printer 1 corresponding to the specified printer communication information 5146 (step SP3).

The timing to transmit the encrypted print job 5133 only needs to be different from the timing to transmit the encryption key 5134. Moreover, the combinations of the pieces of information to be transmitted in steps SP2 and SP3 are not limited only to the combinations mentioned above.

After the server communication unit 51 of the management server 5 transmits the server print instruction, the server communication unit 51 transmits the print acceptance information to the smartphone 4 as a response to the smartphone print instruction (step SP4).

As illustrated in the flowchart FQ, the network printer communication unit 13 of the printer 1 receives the server print instruction (step SQ1).

After the network printer communication unit 13 receives the server print instruction, the network printer communication unit 13 receives the encryption key 5134 (step SQ2).

The printer driver execution unit 101 decrypts the encrypted print job 5133 included in the server print instruction received in step SQ1 by using the encryption key 5134 received in step SQ2 (step SQ3).

After the printer driver execution unit 101 decrypts the encrypted print job 5133, the printer driver execution unit 101 generates the print data based on the decrypted print job 5132 and on the printing conditions included in the server print instruction received in step SQ1 (step SQ4).

After the printer driver execution unit 101 generates the print data, the printing unit 12 starts the printing based on the generated print data (step SQ5).

When the printer control unit 10 determines that the printing is successful (step SG3: "successful"), the printer control unit 10 generates the printing result by adding the user ID 5121 and the print job ID 5131 included in the server print instruction, and the printer communication unit 11 transmits the generated printing result to the management server 5 (step SQ6).

According to the third embodiment, the printer 1 has the functions of the office PC 2. Hence, the configuration of the third embodiment has the same effects as those of the first embodiment.

Fourth Embodiment

Next, a fourth embodiment will be described. In the fourth embodiment, the same constituents as the constituents of the above-described embodiments will be denoted by the same reference signs and detailed explanations thereof will be omitted.

The third embodiment has the configuration in which the management server 5 transmits the encrypted print job 5133 and the encryption key 5134 to the printer 1, and the printer 1 generates the print data by decrypting the encrypted print job 5133.

The fourth embodiment has a configuration in which the management server 5 generates the print data based on the print job 5132 received from the office PC 2, and transmits the generated print data to the printer 1.

In the fourth embodiment, the print job 5132 is not encrypted by the management server 5 as with the second embodiment. Accordingly, one print job record stored in the print job management DB 513 of the fourth embodiment does not include the encrypted print job 5133 or the encryption key 5134.

Figure 13:
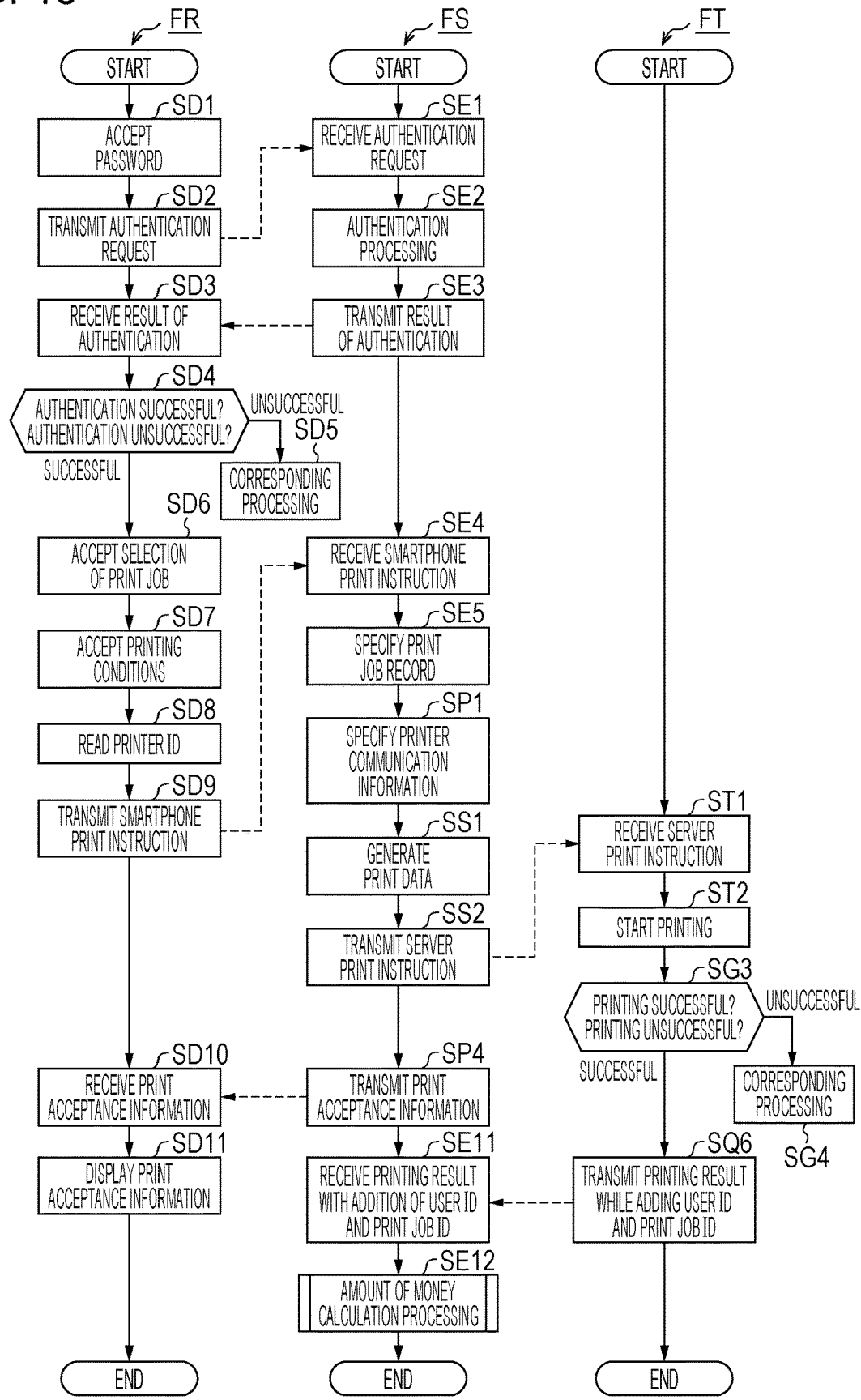
FIG. 13 is a flowchart illustrating operations of the printing system.

FIG. 13 illustrates flowcharts of operations of the printing system 1000 in the fourth embodiment. In FIG. 13, a flowchart FR illustrates an operation of the smartphone 4, a flowchart FS illustrates an operation of the management server 5, and a flowchart FT illustrates an operation of the printer 1.

In FIG. 13, the same steps as those in the flowcharts illustrated in FIG. 12 will be denoted by the same step numbers and detailed explanations thereof will be omitted.

The operation of the printing system 1000 during the period from the start of the authentication by the user U with the smartphone 4 to the specification of the print job record by the management server 5, the operation of the management server 5 in the amount of money calculation processing, and the operations of the management server 5 concerning the collection and the payment are the same as those of the first embodiment.

As illustrated in the flowchart FS, the data processing unit 502 of the management server 5 generates the print data based on the print job 5132 included in the print job record specified in step SE5 and on the printing conditions included in the received smartphone print instruction (step SS1).

After the data processing unit 502 generates the print data, the server communication unit 51 transmits the server print instruction to the printer 1 (step SS2).

The server print instruction to be transmitted in step SS2 includes the user ID 5121 as well as the print job ID 5131 included in the print job record specified in step SE5, the printer ID 5143 included in the smartphone print instruction, and the generated print data.

As illustrated in the flowchart FT, The network printer communication unit 13 of the printer 1 receives the server print instruction (step ST1).

After the network printer communication unit 13 receives the server print instruction, the printing unit 12 starts the printing based on the print data included in the server print instruction received in step ST1 (step ST2).

According to the above-described configuration, the configuration of the fourth embodiment has the same effects as those of the first embodiment.

Fifth Embodiment

Next, a fifth embodiment will be described.

As compared to the respective embodiments described above, the following configuration is different in the fifth embodiment.

The above-described embodiments have the configuration in which the management server 5 executes the amount of money calculation processing based on the printing result. Meanwhile, the server control unit 50 of the fifth embodiment executes the amount of money calculation processing based on the printing conditions included in the smartphone print instruction. In the fifth embodiment, the server control unit 50 executes the amount of money calculation processing while using the user record corresponding to the user ID 5121 included in the smartphone print instruction as a processing target.

The acquisition unit 504 acquires the action information from the printing conditions included in the smartphone print instruction. The action information of the fifth embodiment is information indicating how the printer 1 acts in the printing based on the print data. The action information exemplifies a case of indicating the number of printed sheets at the time of the printing based on the print data, and the printing mode which is either in color or in black and white. After the acquisition unit 504 acquires the action information, the management server 5 executes the processing corresponding to steps SH2, SH3, SH4, and SH5 illustrated in FIG. 6.

In the fifth embodiment, the printer 1, the office PC 2, and the management server 5 may be configured not to transmit or receive the printing result.

According to the above-described configuration, the configuration of the fifth embodiment has the same effects as those of the first embodiment.

According to the fifth embodiment, the management server 5 calculates the amount of money charged to the user U and the amount of money paid to the administrator A based on the action information acquired out of the printing conditions by the acquisition unit 504. Thus, it is possible to calculate the amount of money charged and the amount of money paid based on the printing conditions designated by the user U, and thus to construct the system that enables the administrator A to gain an appropriate revenue for the administration of the printer 1. In this way, it is possible to provide the system that can properly collect the amount of money charged to the user U concerning the use of the printer 1.

Sixth Embodiment

Next, a sixth embodiment will be described.

As compared to the respective embodiments described above, the following configuration is different in the sixth embodiment.

In the amount of money calculation processing, the management server 5 of the sixth embodiment calculates the amount of money charged to the user U and the amount of money paid to the administrator A based on manufacturer information on the printer 1 used by the user U.

The manufacturer information is information indicating a manufacturer of the printer 1. A manufacturer name is an example of the manufacturer information. In the sixth embodiment, the printer ID 5143 is linked with the manufacturer information corresponding to the printer 1 indicated by the printer ID 5143 in the administrator record. The server storage unit 510 may be configured to store a database for linking the printer ID 5143 with the manufacturer information separately from the administrator management DB.

In the sixth embodiment, the calculation unit 505 of the management server 5 specifies the manufacturer information linked with the printer ID 5143 added to the printing result or the printing conditions. The management server 5 calculates the amount of money charged to the user U and the amount of money paid to the administrator A based on the action information that the acquisition unit 504 acquires from the printing result or the printing conditions and on the specified manufacturer information.

According to the sixth embodiment, the management server 5 can calculate the amount of money charged and the amount of money paid depending on the manufacturer of the printer 1 used by the user U. Hence, the management server 5 can calculate the amount of money charged and the amount of money paid while taking into account the manufacturer of the printer 1 used by the user U. For example, the management server 5 can calculate different amounts of money charged and different amounts of money paid depending on the manufacturers.

Seventh Embodiment

Next, a seventh embodiment will be described.

As compared to the respective embodiments described above, the seventh embodiment is different in the following configuration. The management server 5 is configured to output maintenance information to the office PC 2 when the administrator A enters into a maintenance contract for the printer 1 administered by the administrator A. The maintenance information is information indicating running out of the ink, for example.

In one administrator record stored in the administrator management DB 514, the administrator ID 5141 is linked with maintenance contract existence information indicating whether or not the administrator A enters into the maintenance contract. The server control unit 50 of the management server 5 determines whether or not a benchmark to cause the printer 1 to output the maintenance information is met based on the printing result or the printing conditions. When the server control unit 50 determines that the benchmark to output the maintenance information is met, the server control unit 50 determines whether or not the maintenance contract existence information, which is linked with the administrator ID 5141 of the administrator A regarding the printer 1 determined to meet the benchmark, indicates that the maintenance contract is entered into. When the maintenance contract existence information indicates that the maintenance contract is entered into, the server control unit 50 outputs the maintenance information to the administrator A of the printer 1.

The server control unit 50 monitors an amount of ink usage of the printer 1 based on the printing conditions or the printing result. When the monitored amount of ink usage reaches a threshold to output the maintenance information, the server control unit 50 refers to the maintenance contract existence information linked with the administrator A of the printer 1 that reaches the threshold, and determines whether or not the maintenance contract is entered into. When the server control unit 50 determines that the maintenance contract is entered into, the server control unit 50 outputs the maintenance information indicating that the ink is running out to the office PC 2 connected to the printer 1 which reaches the threshold.

According to the seventh embodiment, the management server 5 enables the administrator A to recognize the maintenance information. Thus, it is possible to improve the convenience of the administrator A in administering the printer 1.

Each of the above-described embodiments merely depicts a certain aspect and may be modified or applied as appropriate.

The above-described embodiments have the configuration in which the management server 5 receives the print job 5132 and the management server 5 transmits the received print job 5132 to the smartphone 4. However, a destination of transmission of the print job 5132 from the management server 5 is not limited only to the smartphone 4, and a terminal different from the smartphone 4 such as a tablet PC used by the user U may be included as the destination of transmission. In this case, the terminal communication information 5123 on the different terminal used for transmitting the information to the different terminal is included in one user record in the user management DB 512. The printing application 411 is installed on the different terminal.

Although the printer 1 is depicted as an example of the image processing device, the image processing device may be a different device such as a multifunction printer that also has functions other than the printing function such as a scanning function and a facsimile function.

The functions of the printer control unit 10, the office PC control unit 20, the user PC control unit 30, the smartphone control unit 40, and the server control unit 50 may be implemented by multiple processors or semiconductor chips.

The respective units illustrated in FIGS. 2 and 10 are mere examples and the units are not limited to the illustrated units. It is not always necessary to embed hardware corresponding individually to each of the units, and it is of course possible to adopt a configuration in which a single processor implements the function of each of the units by executing an appropriate program. Part of the functions to be realized by hardware may be implemented by software, or part of the functions to be implemented by the software may be realized by the hardware. In the meantime, specific detailed configurations of other units in the respective devices in the printing system 1000 may be changed as appropriate.

The units of the steps of the operations illustrated in FIGS. 4 to 9 and in FIGS. 12 and 13 are segmented in accordance with main details of the processing in order to facilitate the understanding of the operations of the respective devices in the printing system 1000, and are not intended to constitute any limitations based on the way of segmentation or the names of the respective units of the processing. Depending on the details of the processing, these units of the processing may further be segmented into more units of steps. Meanwhile, one unit of a step may be segmented so as to further include more processing details. In the meantime, the order of the steps is interchangeable as appropriate.

What is claimed is:

1. A management server connected to a control device that communicates with an image processing device used by a user, comprising:
    a server connection unit interface connected to the control device through a network;
    a processor instantiating an acquisition unit that acquires operation information on the image processing device conducted by the user from the control device connected to the server connection unit interface, the operation information being based on a printing result of the imaging processing device;

a physical volatile and non-volatile storage unit that stores identification information of the image processing device and administrator information that indicates the administrator of the image processing device and linking the identification information and the administrator information, the physical volatile and non-volatile storage unit further storing an encrypted print job that is encrypted by the processor using an encryption key; and the processor instantiating a calculation unit that calculates an amount of money the user will be charged by the administrator indicated by the administrator information linked with the identification information on the image processing device concerning the acquired operation information based on the operation information acquired by the acquisition unit.

2. The management server according to claim 1, further comprising:

an authentication unit that authenticates the user of the image processing device, wherein the calculation unit calculates an amount of money charged to the user successfully authenticated by the authentication unit based on the action information on the user acquired by the acquisition unit.

3. The management server according to claim 2, wherein the authentication unit authenticates a second user different from the user, the acquisition unit acquires second operation information on the second user, and the calculation unit calculates a second amount of money charged to the second user successfully authenticated by the authentication unit based on the second operation information on the second user acquired by the acquisition unit.

4. The management server according to claim 3, further comprising:

a user management database that stores information on the user and the second user, wherein the user management database stores first collected amount of money charged information concerning collection of the amount of money charged to the user and second collected amount of money charged information concerning collection of the second amount of money charged to the second user, and the amount of money charged and the second amount of money charged are added up when first payer information included in the first collected amount of money charged information is the same as second payer information included in the second collected amount of money charged information.

5. The management server according to claim 1, wherein the server connection unit interface outputs the encrypted print job to the control device.

6. The management server according to claim 5, wherein the print job incudes a printing condition, and the acquisition unit acquires the operation information from the printing condition included in the print job.

7. The management server according to claim 1, wherein the image processing device includes a printing unit, the operation information indicates a number of printed sheets printed by the user with the image processing device, and the calculation unit calculates the amount of money the user will be charged by the administrator based on the number of printed sheets acquired by the acquisition unit.

8. The management server according to claim 7, wherein the acquisition unit acquires the number of printed sheets from a printing result of the image processing device.

9. A non-transitory computer-readable storage medium storing a management program to be executed by a computer of a management server administered by an administrator and connected to a control device that communicates with an image processing device used by a user, the management program causing the computer:

to acquire operation information on the image processing device from the control device connected through a network, the operation information being based on a printing result of the imaging processing device;

to store identification information on the image processing device and administrator information indicating the ac administrator of the image processing device and to link the identification information and the administrator information;

to encrypt a print job using an encryption key; and to calculate an amount of money the user will be charged by the administrator indicated by the administrator information linked with the identification information of the image processing device concerning the acquired operation information based on the acquired operation information.

10. The non-transitory computer-readable storage medium storing the management program according to claim 9, the management program further causing the computer:

to execute authentication of the user; and to calculate an amount of money charged to the successfully authenticated user based on the acquired action information on the user.

11. The non-transitory computer-readable storage medium storing the management program according to claim 10, the management program further causing the computer:

to execute authentication of a second user different from the user;

to acquire second operation information on the second user; and to calculate a second amount of money charged to the successfully authenticated second user based on the acquired second operation information on the second user.

12. The non-transitory computer-readable storage medium storing the management program according to claim 11, the management program further causing the computer:

to store a user management database that stores information on the user and the second user, wherein the user management database stores first collected amount of money charged information concerning collection of the amount of money charged to the user and second collected amount of money charged information concerning collection of the second amount of money charged to the second user, and the management program causes the computer to add up the amount of money charged and the second amount of money charged when first payer information included in the first collected amount of money charged information is the same as second payer information included in the second collected amount of money charged information.

13. The non-transitory computer-readable storage medium storing the management program according to claim 9, the management program further causing the computer:

to output the encrypted print job to the control device.

14. The non-transitory computer-readable storage medium storing the management program according to claim 9, wherein the image processing device includes a printing unit, the operation information indicates a number of printed sheets printed by the user with the image processing device, and the management program causes the computer to calculate the amount of money the user will be charged by the administrator based on the acquired number of printed sheets.

15. The non-transitory computer-readable storage medium storing the management program according to claim 14, the management program further causing the computer:

to receive a printing result of the image processing device; and to acquire the number of printed sheets from the received printing result.

16. The non-transitory computer-readable storage medium storing the management program according to claim 14, wherein the print job includes a printing condition, and the management program causes the computer to acquire the action information from the printing condition included in the print job.

17. An image processing system to be administered by an administrator, comprising:

an image processing device used by a user;

a control device that communicates with the image processing device; and a management server connected to the control device through a network, wherein the management server includes a server connection unit interface connected to the control device through the network, a processor instantiating an acquisition unit that acquires action information on the image processing device from the control device connected to the server connection unit interface, the operation information being based on a printing result of the imaging processing device, a physical volatile and non-volatile storage unit that stores identification information on the image processing device and administrator information indicating the administrator of the image processing device and stores the identification information and the administrator information, the physical volatile and non-volatile storage unit further storing an encrypted print job that is encrypted by the processor using an encryption key, and a calculation unit that calculates an amount of money the user will be charged by the administrator indicated by the administrator information linked with the identification information of the image processing device concerning the acquired operation information based on the operation information acquired by the acquisition unit.

18. The image processing system according to claim 17, wherein the management server further includes an authentication unit that authenticates the user of the image processing device, and the calculation unit calculates an amount of money charged to the user successfully authenticated by the authentication unit based on the operation information on the user acquired by the acquisition unit.

19. The image processing system according to claim 17, wherein the server connection unit interface outputs the encrypted print job to the control device.

20. The image processing system according to claim 17, wherein the image processing device includes a printing unit, the operation information indicates a number of printed sheets printed by the user with the image processing device, and the calculation unit of the management server calculates the amount of money the user will be charged by the administrator based on the number of printed sheets acquired by the acquisition unit.

* * * * *